United States Patent
Tada

(10) Patent No.: US 9,049,424 B2
(45) Date of Patent: Jun. 2, 2015

(54) RECORDING MEDIUM STORING DISPLAY CONTROL PROGRAM FOR CONTROLLING DISPLAY CAPABLE OF PROVIDING STEREOSCOPIC DISPLAY, DISPLAY SYSTEM, DISPLAY CONTROL METHOD, AND DISPLAY

(75) Inventor: Youichi Tada, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 895 days.

(21) Appl. No.: 13/242,113

(22) Filed: Sep. 23, 2011

(65) Prior Publication Data

US 2012/0306856 A1    Dec. 6, 2012

(30) Foreign Application Priority Data

Jun. 3, 2011 (JP) .................... 2011-125439

(51) Int. Cl.
| | |
|---|---|
| G06T 15/00 | (2011.01) |
| H04N 13/00 | (2006.01) |
| A63F 13/00 | (2014.01) |
| H04N 13/02 | (2006.01) |

(52) U.S. Cl.
CPC .... *H04N 13/0022* (2013.01); *H04N 2013/0081* (2013.01); *A63F 13/00* (2013.01); *H04N 13/0275* (2013.01); *A63F 2300/204* (2013.01); *A63F 2300/301* (2013.01); *A63F 2300/6653* (2013.01); *A63F 2300/6684* (2013.01)

(58) Field of Classification Search
CPC .................................................. H04N 13/0022
See application file for complete search history.

(56) References Cited

U.S. PATENT DOCUMENTS

| | | |
|---|---|---|
| 2005/0089212 A1 | 4/2005 | Mashitani et al. |
| 2005/0219239 A1 | 10/2005 | Mashitani et al. |

FOREIGN PATENT DOCUMENTS

| | | |
|---|---|---|
| JP | 2004-7396 | 1/2004 |
| JP | 2004-094150 | 3/2004 |
| JP | 2005-295004 | 10/2005 |

OTHER PUBLICATIONS

Dec. 4, 2013 Search Report for EP 11182652.5, 6 pages.
Jan. 13, 2014 Office Action in U.S. Appl. No. 13/362,657, 5 pages.

*Primary Examiner* — Sath V Perungavoor
*Assistant Examiner* — Kate Luo
(74) *Attorney, Agent, or Firm* — Nixon & Vanderhye PC

(57) ABSTRACT

An exemplary embodiment provides a program for controlling a display capable of providing stereoscopic display. The program includes image output instructions for outputting an image for left eye and an image for right eye to the display, parallax calculation instructions for calculating parallax produced when an object is displayed on the display, and movement-and-display instructions for carrying out at least one of movement of a displayed object out of an effective display range and movement of a not-displayed object into the effective display range in accordance with the calculated parallax.

14 Claims, 16 Drawing Sheets

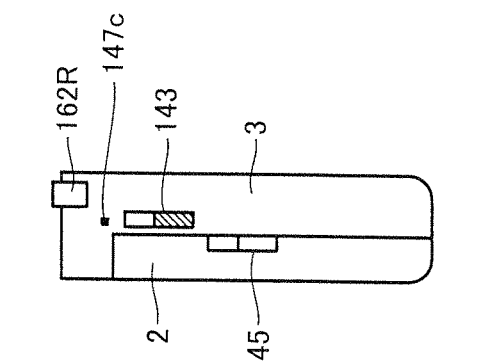
FIG.2D
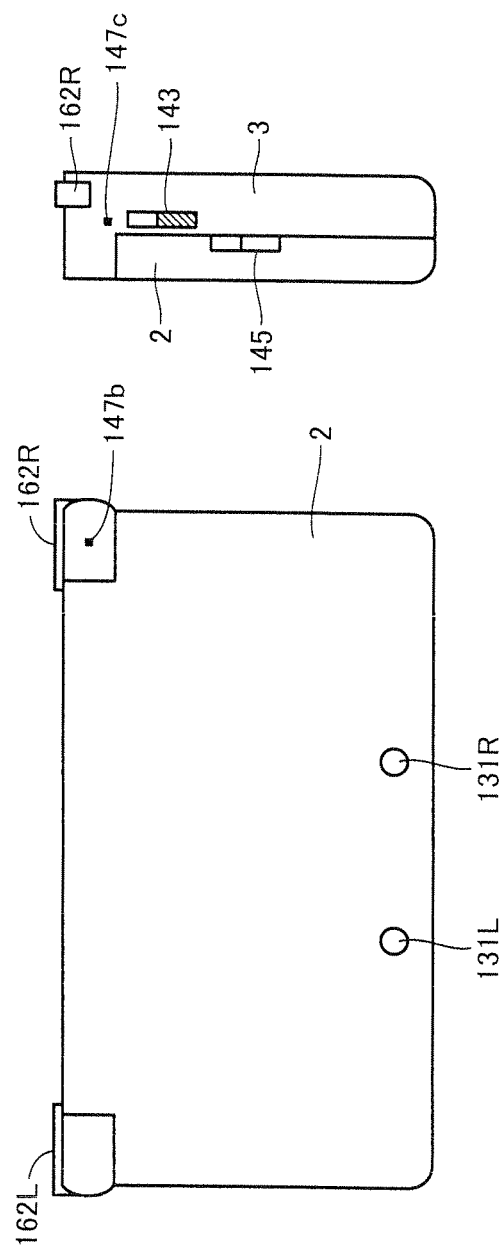
FIG.2A
FIG.2B
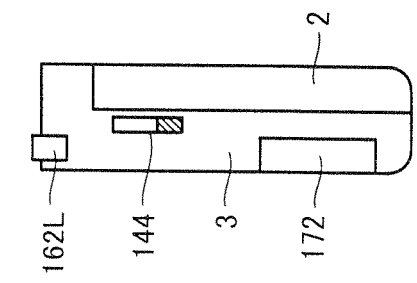
FIG.2C

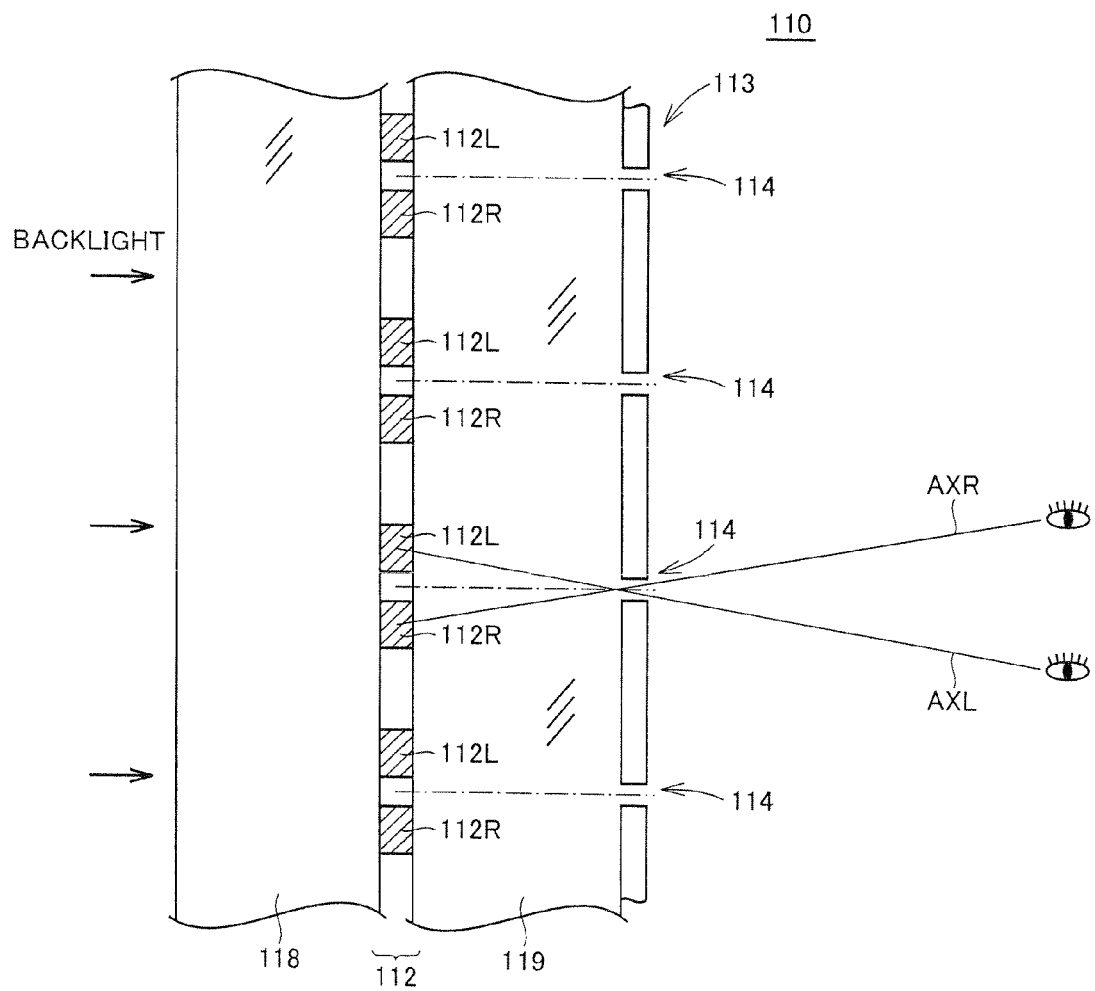

FIG.8A
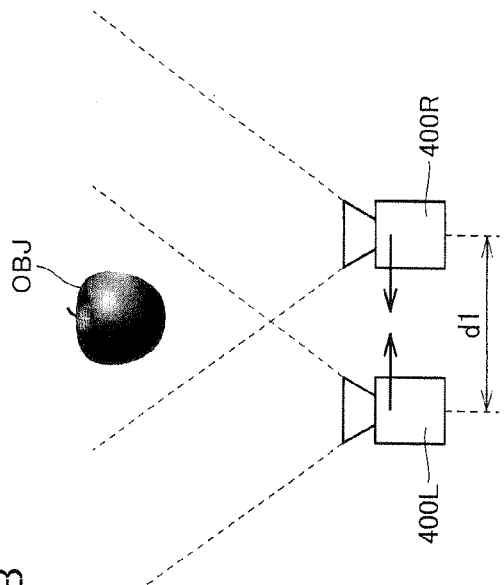
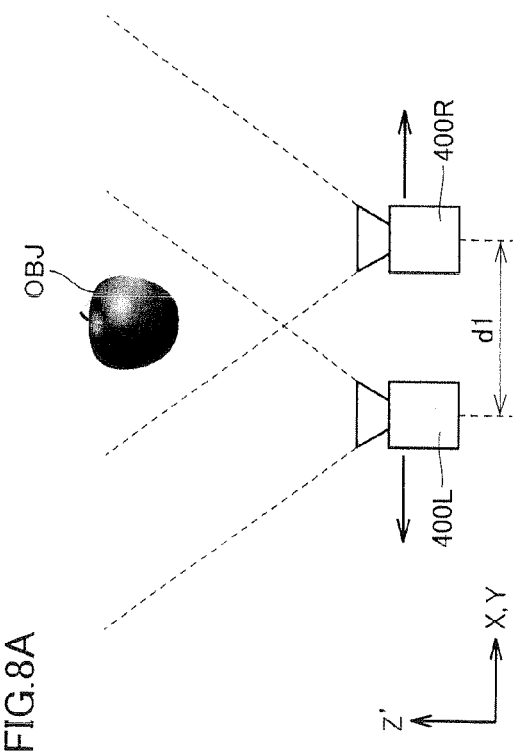
FIG.8B
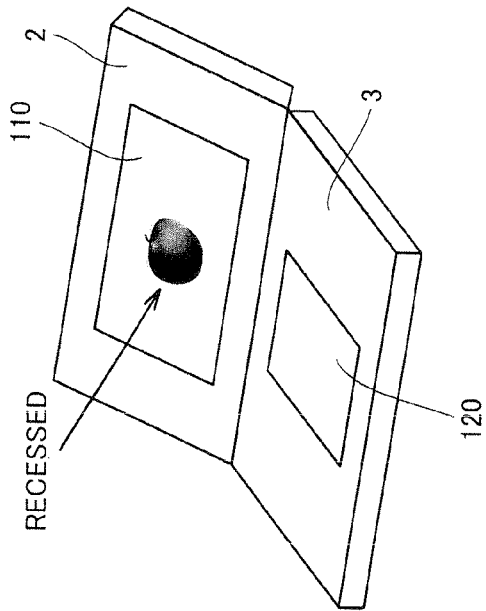
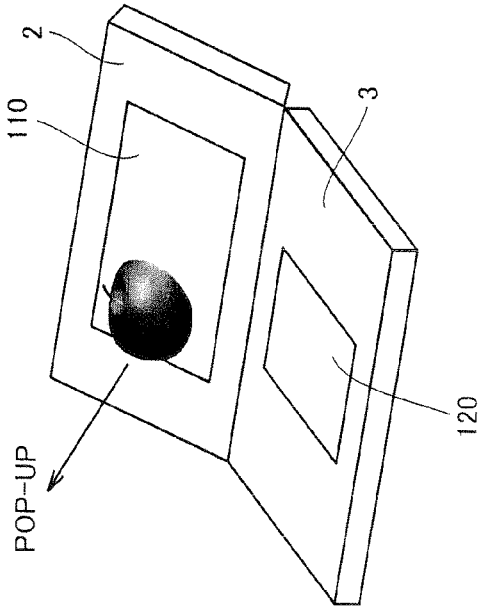

RECORDING MEDIUM STORING DISPLAY CONTROL PROGRAM FOR CONTROLLING DISPLAY CAPABLE OF PROVIDING STEREOSCOPIC DISPLAY, DISPLAY SYSTEM, DISPLAY CONTROL METHOD, AND DISPLAY

This nonprovisional application is based on Japanese Patent Application No. 2011-125439 filed with the Japan Patent Office on Jun. 3, 2011, the entire contents of which are hereby incorporated by reference.

FIELD

The invention relates to a recording medium storing a display control program for controlling a display capable of providing stereoscopic display, a display system, a display control method, and a display.

BACKGROUND AND SUMMARY

A method of providing stereoscopic display by using two images having parallax has conventionally been known. For example, a technique for artificially causing stereoscopic effect by providing parallax images (left and right images) obtained from two cameras to left and right eyes respectively is known.

A typical method of generating a parallax image includes a method of arranging an object to be displayed in a three-dimensional virtual space and picking up an image of this object with a pair of virtual cameras. In a case where such a method is adopted, when the pair of virtual cameras is relatively close to an object, the object looks like popping up toward the front from a display surface when viewed from a user (observer). Namely, parallax of the object at the display surface becomes relatively great and consequently the user visually recognizes the object with higher stereoscopic effect.

An exemplary embodiment provides a recording medium storing a display control program, a display system, a display control method, and a display capable of realizing more natural stereoscopic display.

According to an exemplary embodiment, a recording medium storing a display control program for controlling a display capable of providing stereoscopic display is provided. The display control program includes image output instructions for outputting an image for left eye and an image for right eye to the display, parallax calculation instructions for calculating parallax produced when an object is displayed on the display, and movement-and-display instructions for carrying out at least one of movement of a displayed object out of an effective display range and movement of a not-displayed object into the effective display range in accordance with the calculated parallax.

According to the exemplary embodiment, each object is stereoscopically displayed with parallax that should originally be produced. An object of which parallax produced when the object is displayed on the display satisfies a prescribed condition is switched from a display state to a non-display state or switched from a non-display state to a display state. Therefore, stereoscopic effect between the stereoscopically displayed objects can naturally be expressed.

According to am exemplary embodiment, the movement-and-display instructions cause, in response to parallax produced in the displayed object satisfying a first condition, movement of the object out of the effective display range, and cause, in response to parallax produced when the not-displayed object is displayed on the display satisfying a second condition different from the first condition, movement of the object into the effective display range.

According to the exemplary embodiment, since a condition involved with display/non-display of an object is different, in a case where produced parallax satisfies a condition for display, even an object once switched to non-display is switched again to a display state. Therefore, smoother stereoscopic display can also be realized.

According to an exemplary embodiment, the movement-and-display instructions include image generation instructions for generating the image for left eye and the image for right eye by picking up images of an object arranged in a virtual space with a pair of virtual cameras and positional relation updating instructions for updating relative positional relation between the object arranged in the virtual space and the pair of virtual cameras.

According to the exemplary embodiment, control of parallax produced when an object is displayed on the display can be realized by adjusting relative positional relation between the object in the virtual space and the pair of virtual cameras. Therefore, processing can be simplified even when a plurality of objects are stereoscopically displayed.

According to an exemplary embodiment, the movement-and-display instructions cause movement of the displayed object out of the effective display range or movement of the not-displayed object into the effective display range based on comparison of a distance from a reference plane which is a plane including the pair of virtual cameras in the virtual space to the object with a prescribed value.

According to an exemplary embodiment, the movement-and-display instructions cause movement of the displayed object out of the effective display range when a distance from the reference plane to the object is equal to or smaller than a first prescribed value and cause movement of the not-displayed object into the effective display range when a distance from the reference plane to the object is equal to or greater than a second prescribed value different from the first prescribed value.

According to an exemplary embodiment, the second prescribed value is greater than the first prescribed value.

According to the exemplary embodiment, such a situation that processing for moving a displayed object out of the effective display range to set the object to a not-displayed state and processing for setting a not-displayed object to a displayed state and then moving the object to a position of display of the object are repeatedly performed can be prevented.

According to an exemplary embodiment, the movement-and-display instructions cause movement of the object such that parallax produced in the moving object is substantially maintained.

According to the exemplary embodiment, natural stereoscopic display also of a moving object can be provided.

According to an exemplary embodiment, the positional relation updating instructions provide display of the object as moving, by moving the object in an orientation in parallel to the reference plane within the virtual space.

According to the exemplary embodiment, by moving the object in an orientation in parallel to the reference plane within the virtual space, parallax produced in the moving object can substantially be maintained. Therefore, it is not necessary to sequentially calculate parallax produced in the moving object and processing can be simplified.

According to an exemplary embodiment, the movement-and-display instructions cause gradual movement of the object.

According to the exemplary embodiment, the object can be moved out of the effective display range, taking a certain period of time. Therefore, such an effect that the object is not immediately set to non-display but it is set to non-display some time later can be provided.

According to an exemplary embodiment, the movement-and-display instructions differ an orientation of movement of the object in accordance with a position of display of the object on a display surface of the display.

According to the exemplary embodiment, since a direction of movement of the object out of the effective display range and/or a direction of movement of the object from the outside of the effective display range can be determined based on a position of display of the object, a direction of movement in switching between a display state and a non-display state of the object can more appropriately be set.

According to an exemplary embodiment, the movement-and-display instructions differ an orientation of movement of the object in accordance with a distance from a position of display of the object to outside of the effective display range.

According to the exemplary embodiment, since a direction of movement of the object out of the effective display range and/or a direction of movement of the object from the outside of the effective display range can be determined based on a distance from a position of display to the outside of the effective display range, a direction of movement in switching between a display state and a non-display state of the object can more appropriately be set.

According to an exemplary embodiment, the movement-and-display instructions cause movement of the object in an orientation in which a travel distance from a position of display of the object to outside of the effective display range is shortest.

According to the exemplary embodiment, since a time period for moving the object out of the effective display range and/or a time period for moving the object from the outside of the effective display range can be shortened, user's awkward feeling about movement of the object can be lessened.

According to an exemplary embodiment, a display system including a display portion capable of providing stereoscopic display and a control entity for controlling display on the display portion is provided. The display system includes an image output unit for outputting an image for left eye and an image for right eye to the display portion, a parallax calculation unit for calculating parallax produced when an object is displayed on the display portion, and a movement-and-display unit for carrying out at least one of movement of a displayed object out of an effective display range and movement of a not-displayed object into the effective display range in accordance with the calculated parallax.

According to an exemplary embodiment, a display control method performed in a computer of a display capable of providing stereoscopic display is provided. The display control method includes an image output step of outputting an image for left eye and an image for right eye to the display, a parallax calculation step of calculating parallax produced when an object is displayed on the display, and a movement-and-display step of carrying out at least one of movement of a displayed object out of an effective display range and movement of a not-displayed object into the effective display range in accordance with the calculated parallax.

A display according to an exemplary embodiment includes a display portion capable of providing stereoscopic display, an image output unit for outputting an image for left eye and an image for right eye to the display portion, a parallax calculation unit for calculating parallax produced when an object is displayed on the display portion, and a movement-and-display unit for carrying out at least one of movement of a displayed object out of an effective display range and movement of a not-displayed object into the effective display range in accordance with the calculated parallax.

The foregoing and other objects, features, aspects and advantages of the exemplary embodiment(s) will become more apparent from the following detailed description when taken in conjunction with the accompanying drawings.

BRIEF DESCRIPTION OF THE DRAWINGS

FIGS. 2A to 2D show exemplary non-limiting projection views with an upper surface side of the game device shown in FIG. 1 being the center.

FIG. 6 shows an exemplary non-limiting schematic cross-sectional view of an upper LCD shown in FIG. 5.

FIGS. 8A and 8B show exemplary non-limiting diagrams each for illustrating a method of realizing stereoscopic display using the image generated with the method shown in FIGS. 7A and 7B.

DETAILED DESCRIPTION OF NON-LIMITING EXAMPLE EMBODIMENTS

Figure 1:
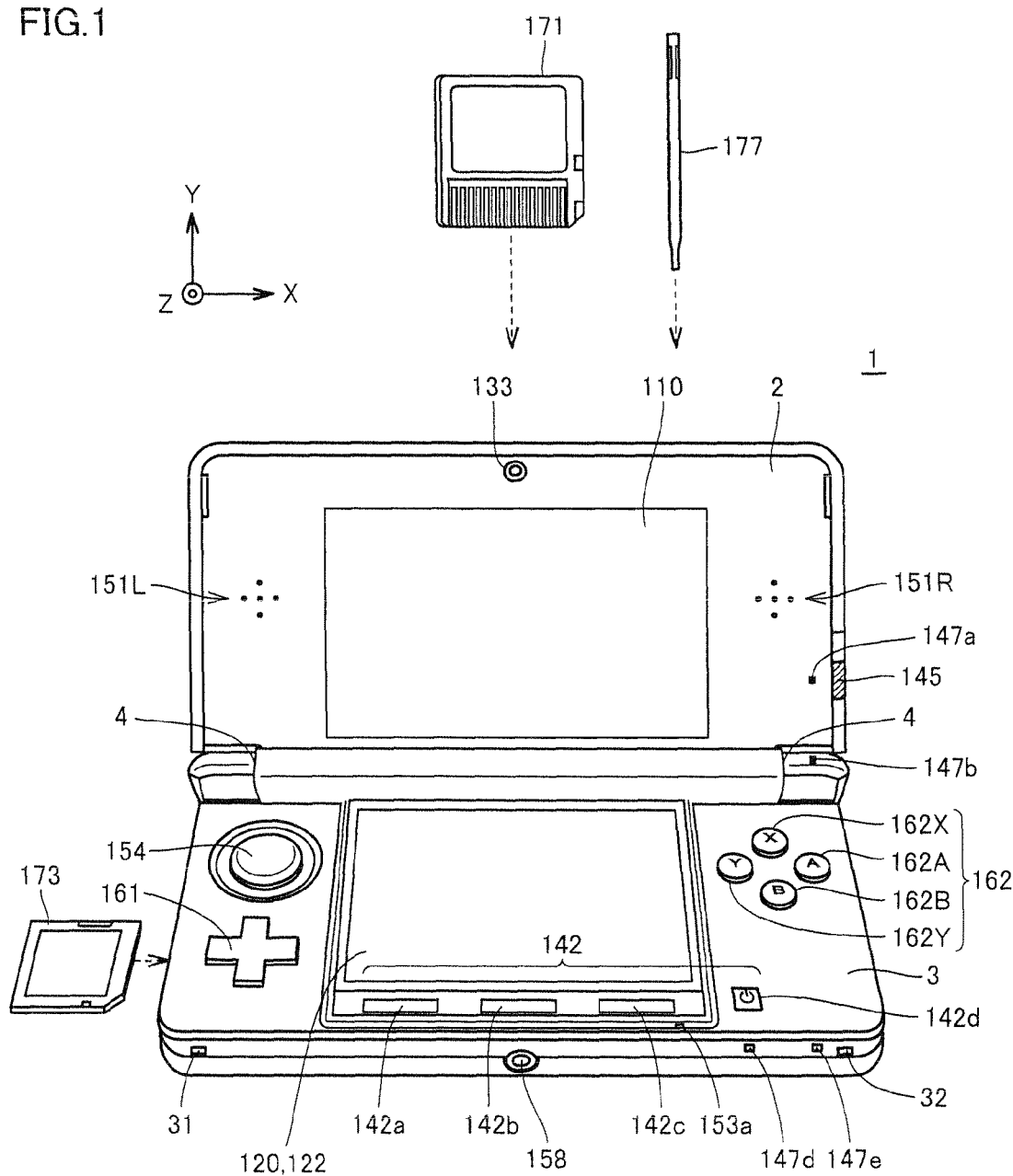
FIG. 1 shows an exemplary non-limiting front view of a game device (in an opened state) according to an exemplary embodiment.

One or more exemplary embodiments will be described in detail with reference to the drawings. The same or corresponding elements in the drawings have the same reference characters allotted and description thereof will not be repeated.

A portable game device 1 representing a computer will be described hereinafter as a representative example of a display according to an exemplary embodiment. In particular, game device 1 according to the present embodiment has a display portion capable of providing stereoscopic display.

The display is not limited to an implementation as portable game device 1, and it may be implemented as a stationary game device, a personal computer, a portable telephone, a portable terminal, or the like. In addition, an implementation as a display control program for controlling a display capable of providing stereoscopic display may be possible. Alternatively, an implementation as a display system including a recording medium storing such a display control program and a processing apparatus main body to which the recording medium can be attached may be possible. Moreover, a display control method according to an exemplary embodiment may be implemented by a display having a display portion capable of providing stereoscopic display and an entity capable of communicating with the display as being in coordination with each other.

A. DEFINITION

"Stereoscopic display", "three-dimensional display" and "3D display" herein mean that an image is expressed in such a manner as enabling a user to stereoscopically visually recognize at least some images (objects). In order for a user to stereoscopically visually recognize an object, typically, physiological functions of human eyes and brain are made use of. Such stereoscopic display is realized by using images generated to enable the user to stereoscopically visually recognize an object (typically, stereo images having parallax).

A position of an object in a direction perpendicular to a display surface, of which presence is visually recognized by the user when the object is stereoscopically displayed, is also referred to as a "stereo depth" or an "amount of pop-up." A degree of this "stereo depth" or "amount of pop-up" is dependent on magnitude of parallax of the object at the display surface.

In the present specification, "parallax" means difference in how a common object is viewed with left eye and with right eye, and typically it is defined as a distance between a position where the object is expressed in one image (an image for left eye) of a stereo image and a position where the same object is expressed in the other image (an image for right eye) of the stereo image.

B. OVERVIEW

Game device 1 representing a typical example of a display according to the present embodiment has a display portion (an upper LCD 110) capable of providing stereoscopic display. As a computer of game device 1 executes a display control program, various objects are stereoscopically displayed. The display control program according to the present embodiment calculates parallax produced when an object is displayed on the display. Then, when the calculated parallax in the displayed object exceeds a prescribed value, the object is moved out of an effective display range so as to be set to a not-displayed state. Thus, parallax produced when the object is stereoscopically displayed can appropriately be maintained. On the other hand, parallax of a not-displayed object that can be produced when the object is displayed on the display portion is also calculated. Then, when this calculated parallax is smaller than a prescribed value, the not-displayed object is displayed and moved to its original display position from the outside of the effective display range.

Namely, the display control program according to the present embodiment provides such a user interface as moving an object between a position of display of an object and the outside of an effective display range, in accordance with parallax produced for each object.

C. OVERALL CONFIGURATION OF GAME DEVICE

Initially, an overall configuration of game device 1 according to the present embodiment will be described.

Figure 3B:
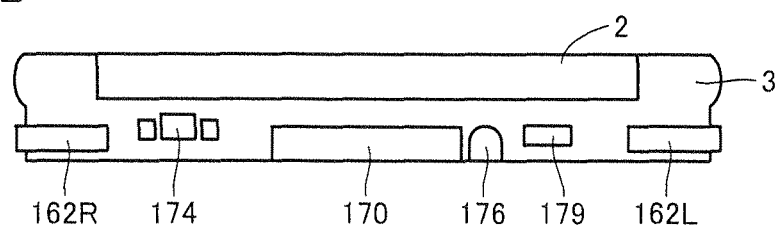
FIGS. 3A and 3B show exemplary non-limiting projection views with a bottom surface side of the game device shown in FIG. 1 being the center.
Figure 3A:
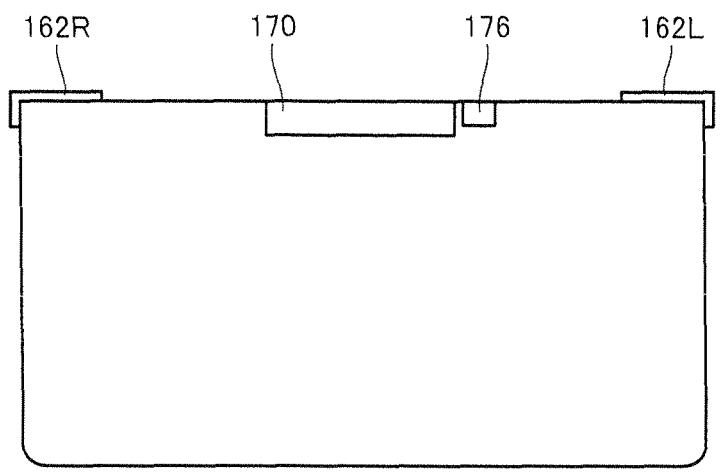

FIG. 1 is a front view of game device 1 (in an opened state) according to an exemplary embodiment. FIG. 2A shows a top view of game device 1 (in a closed state), FIG. 2B shows a front view of game device 1, FIG. 2C shows a left side view of game device 1, and FIG. 2D shows a right side view of game device 1. FIG. 3A shows a bottom view of game device 1 and FIG. 3B shows a rear view of game device 1. In the present specification, for the sake of convenience, with arrangement of game device 1 as shown in FIG. 1 being the reference, the terms "top", "front", "left side", "right side", "bottom", and "rear" are used, however, these terms are formally used and they do not intend to restrict a manner of use of game device 1 by the user.

Portable game device 1 is configured to be foldable. Appearance of game device 1 in an opened state is as shown in FIG. 1, and appearance thereof in a closed state is as shown in FIG. 2A. Game device 1 preferably has such a size that the user can hold game device 1 with both hands or one hand even in the opened state.

Game device 1 has an upper housing 2 and a lower housing 3. Upper housing 2 and lower housing 3 are coupled to be foldable (allow opening and closing). In the example shown in FIG. 1, upper housing 2 and lower housing 3 are each formed like a rectangular plate, and they are coupled to each other to be pivotable around a long side portion thereof by means of a hinge 4. Game device 1 is maintained in the opened state when used by the user and it is maintained in the closed state when not used.

In addition, in game device 1, an angle between upper housing 2 and lower housing 3 can also be maintained at any angle between a position in the closed state and a position in the opened state (approximately 0° to approximately 180°). In other words, upper housing 2 can rest at any angle with respect to lower housing 3. In addition to or instead of friction force, a latch mechanism may be adopted in the coupling portion between upper housing 2 and lower housing 3.

Upper LCD (Liquid Crystal Display) 110 is provided in upper housing 2 as the display portion (display means) capable of providing stereoscopic display. Upper LCD 110 has a rectangular display region and it is arranged such that a direction in which its long side extends coincides with a direction in which a long side of upper housing 2 extends. Such a configuration that upper LCD 110 greater in screen size than a lower LCD 120 is adopted in game device 1 so that the user can further enjoy stereoscopic display is shown. It is noted, however, that the screen size does not necessarily have to be different as such, and a screen size can be designed as appropriate, depending on usage of an application, a size of game device 1, or the like. A detailed configuration of upper LCD 110 will be described later.

An image pick-up device (image pick-up means) for picking up an image of some subject is provided in upper housing 2. More specifically, a pair of outer cameras 131L, 131R (see FIG. 2A) and an inner camera 133 (see FIG. 1) are provided in upper housing 2. Inner camera 133 is arranged above upper LCD 110, while the pair of outer cameras 131L and 131R is arranged in a surface opposite to an inner main surface where inner camera 133 is arranged, that is, in an outer main surface of upper housing 2 (corresponding to a surface on the outside when game device 1 is in the closed state). Based on such positional relation, the pair of outer cameras 131L and 131R can pick up an image of a subject present in a direction in which the outer main surface of upper housing 2 faces, while inner camera 133 can pick up an image of a subject present in a direction opposite to the direction of image pick-up by outer cameras 131L and 131R, that is, in a direction in which the inner main surface of upper housing 2 faces.

The pair of outer cameras 131L and 131R is arranged at a prescribed distance from each other, and prescribed parallax in accordance with relative positional relation between outer camera 131L and outer camera 131R is present between the pair of input images obtained as a result of image pick-up by outer cameras 131L and 131R. Thus, data of a pair of images obtained by these outer cameras 131L and 131R can also be used for stereoscopic display of the subject.

Meanwhile, an input image obtained as a result of image pick-up by inner camera 133 is basically used for non-stereoscopic display (two-dimensional display). Therefore, in game device 1, a pair of input images for stereoscopic display can be obtained by activating outer cameras 131L and 131R, and an input image for non-stereoscopic display can be obtained by activating inner camera 133.

In addition, in upper housing 2, stereoscopic vision volume 145 is provided on the right of upper LCD 110. This stereoscopic vision volume 145 is used for adjusting a degree (parallax and intensity) of stereoscopic effect in stereoscopic display on upper LCD 110.

A speaker (a speaker 151 shown in FIG. 4) serving as an audio generation device (audio generation means) is accommodated in upper housing 2. More specifically, sound emission holes 151L and 151R are arranged on respective left and right sides of upper LCD 110 arranged in a central portion of the inner main surface of upper housing 2. Voice and sound generated from speaker 151 is emitted toward the user through sound emission holes 151L and 151R communicating with speaker 151.

Meanwhile, lower LCD 120 is provided as a display portion (display means) in lower housing 3. Lower LCD 120 has a rectangular display region and it is arranged such that a direction in which its long side extends coincides with a direction in which a long side of lower housing 3 extends.

Though a display portion capable of providing stereoscopic display as will be described later may be adopted as lower LCD 120, in the present embodiment, a common display device for providing non-stereoscopic display (two-dimensional display) of objects and various types of information or the like is adopted. Therefore, for example, a display portion of other appropriate types such as a display portion utilizing EL (Electro Luminescence) may be adopted as lower LCD 120. In addition, resolution of the display portion (display means) is appropriately designed, depending on an application or the like to be executed.

In lower housing 3, a control pad 154, a cross-shaped button 161, and button groups 142, 162 are provided as input means (input devices) for accepting an input operation from a user or the like. These input portions are provided on a main surface of lower housing 3 located on the inner side when upper housing 2 and lower housing 3 are folded. In particular, control pad 154 and cross-shaped button 161 are arranged at such positions as being readily operated with the user's left hand when he/she holds game device 1, and button group 162 is arranged at such a position as being readily operated with the user's right hand when he/she holds game device 1.

Control pad 154 mainly accepts an operation for adjusting stereoscopic display on game device 1. More specifically, control pad 154 has a projection accepting a user's operation and it is structured to be able to change relative positional relation with respect to lower housing 3 at least in a vertical direction of the sheet surface and a horizontal direction of the sheet surface. It is noted that an analog stick, a joystick or the like may be adopted, instead of control pad 154 shown in FIG. 1.

Cross-shaped button 161 is an input portion capable of independently operating two directions, and generates a command having values in accordance with a user's button operation in respective directions. Button group 162 includes four operation buttons 162A, 162B, 162X, and 162Y brought in correspondence with the vertical and horizontal directions of the sheet surface.

The operation input output from cross-shaped button 161 and/or button group 162 may be used for adjustment of stereoscopic display in game device 1. Alternatively, in various applications executed on game device 1, these operation inputs are used for such operations as select, enter and cancel involved with game processing.

Button group 142 includes a select button 142a, a HOME button 142b, a start button 142c, and a power button 142d. Select button 142a is typically used for selecting an application to be executed on game device 1. HOME button 142b is typically used for setting a menu application and/or various applications executed on game device 1 to an initial state. Start button 142c is typically used for starting execution of an application on game device 1. Power button 142d is used for turning ON/OFF power of game device 1.

A microphone (a microphone 153 shown in FIG. 4) serving as an audio obtaining device (audio obtaining means) is accommodated in lower housing 3. On the main surface of lower housing 3, a microphone hole 153a for microphone 153 to obtain sound around game device 1 is provided. It is noted that a position where microphone 153 is accommodated and a position of microphone hole 153a communicating with microphone 153 are not limited to those in the main surface of lower housing 3. For example, microphone 153 may be accommodated in hinge 4 and microphone hole 153a may be provided in the surface of hinge 4 at a position corresponding to a position where microphone 153 is accommodated.

In game device 1, in addition to control pad 154, cross-shaped button 161, and button groups 142, 162, a touch panel 122 is further provided as a pointing device serving as another input portion (input means). Touch panel 122 is attached to cover a screen of lower LCD 120, and when the user performs an input operation (a position indication operation or a pointing operation), touch panel 122 detects a value of a corresponding two-dimensional coordinate.

Typically, resistive touch panel 122 can be adopted. It is noted, however, that touch panel 122 is not limited to the resistive type and various pressing-type touch panels may also be adopted. In addition, touch panel 122 preferably has resolution (detection accuracy) as high as that of lower LCD 120 (display accuracy). It is noted that the resolution of touch panel 122 does not necessarily have to exactly be equal to the resolution of lower LCD 120.

A pointing operation onto touch panel 122 is normally performed by the user with the use of a stylus 177. Instead of stylus 177, however, the pointing operation (input operation) can also be performed with a user's own finger or the like. As shown in FIGS. 1 and 3B, an accommodation portion 176 for stylus 177 is provided in the rear surface of lower housing 3. Stylus 177 for an input operation onto touch panel 122 is normally stored in accommodation portion 176 and it is taken out by the user as necessary.

Instead of or in addition to touch panel 122, a mouse, a track ball, a pen tablet, or the like may be employed as the pointing device serving as the input portion (input means) accepting an instruction of a position from the user. In addition, a pointer device capable of indicating a coordinate value remotely from the display surface of the display portion (typically, a controller or the like of Wii®) may be adopted. In a case of using any device, the device is preferably configured to accept an instruction of a position associated with a position within a display region of lower LCD 120.

As shown in FIGS. 2C, 2D, 3A, and 3B, an L button 162L is provided at a left end portion of the rear surface of lower housing 3, and an R button 162R is provided at a right end portion of the rear surface of lower housing 3. L button 162L and R button 162R are used for such an operation as select in various applications executed on game device 1.

As shown in FIG. 2C, sound volume 144 is provided on a left side surface of lower housing 3. Sound volume 144 is used for adjusting a volume of the speaker (speaker 151 shown in FIG. 4) mounted on game device 1.

As shown in FIG. 2D, a wireless switch 143 is provided on the right side surface of lower housing 3. Wireless switch 143 switches wireless communication in game device 1 between an ON state (an active state) and an OFF state (an inactive state).

A game card 171 and/or a memory card 173 can be attached to game device 1. More specifically, as shown in FIG. 3B, a game card slot 170 for attaching game card 171 is provided in the rear surface of lower housing 3. In the rear of game card slot 170, an interface for electrical connection between game device 1 and game card 171 is provided. Game card slot 170 is configured such that game card 171 is removably attached. Game card 171 retains an application program, a game program (both of which include an instruction set), or the like.

In addition, as shown in FIG. 2C, a memory card slot 172 for attaching memory card 173 is provided in the left side surface of lower housing 3. In the rear of memory card slot 172, an interface for electrical connection between game device 1 and memory card 173 is provided. Memory card slot 172 is configured such that memory card 173 is removably attached. Memory card 173 is used for reading a program or image data obtained from another information processing apparatus or game device, storage (saving) of data of an image picked up and/or processed by game device 1, or the like. Game card 171 is implemented by a non-volatile recording medium such as an SD (Secure Digital) card.

In game device 1, an indicator for presenting an operation state or the like to the user is provided. More specifically, in lower housing 3 and upper housing 2, an indicator group 147 consisting of a plurality of LEDs (Light Emitting Diodes) is provided. Indicator group 147 includes a stereoscopic display indicator 147a, a notification indicator 147b, a wireless indicator 147c, a power supply indicator 147d, and a charge indicator 147e. Stereoscopic display indicator 147a is provided on the main surface of upper housing 2 and other indicators are provided on the main surface or on the side surface of lower housing 3.

Stereoscopic display indicator 147a gives notification of whether stereoscopic display is provided on upper LCD 110 or not. Typically, while stereoscopic display on upper LCD 110 is active, stereoscopic display indicator 147a illuminates.

Notification indicator 147b gives notification of whether information to be notified of the user is present or not. Typically, when a mail unread by the user is present or when some message is received from various servers, notification indicator 147b illuminates.

Wireless indicator 147c gives notification of a state of wireless communication in game device 1. Typically, when wireless communication is active, wireless indicator 147c illuminates.

Power supply indicator 147d gives notification of a power supply state in game device 1. Game device 1 contains a not-shown battery (typically, accommodated in lower housing 3), and it is mainly driven by electric power from this battery. Therefore, power supply indicator 147d gives notification of a state of power ON in game device 1 and/or a state of charge of the battery. Typically, while power of game device 1 is turned ON (in the ON state) and a state of charge of the battery is sufficiently high, power supply indicator 147d illuminates in green, and while power of game device 1 is turned ON (in the ON state) and a state of charge of the battery is low, it illuminates in red.

Charge indicator 147e gives notification of a state of charge of the battery described above. Typically, when a charge adapter (not shown) or the like is attached to game device 1 and the contained battery is being charged, charge indicator 147e illuminates. It is noted that the charge adapter is connected to a charge terminal 174 provided in the rear surface of game device 1, as shown in FIG. 3A.

In addition, game device 1 incorporates an infrared communication function and an infrared port 179 is provided on the rear surface of game device 1. This infrared port 179 projects/receives infrared rays, which are carrier waves for data communication.

In the front surface of game device 1, hooks 31, 32 for connection to a strap for suspending game device 1 are provided. On the front surface of lower housing 3, a connection terminal 158 for connecting a headphone and/or a microphone is provided.

D. ELECTRICAL CONFIGURATION OF GAME DEVICE

An electrical configuration of game device 1 according to the present embodiment will now be described.

Figure 4:
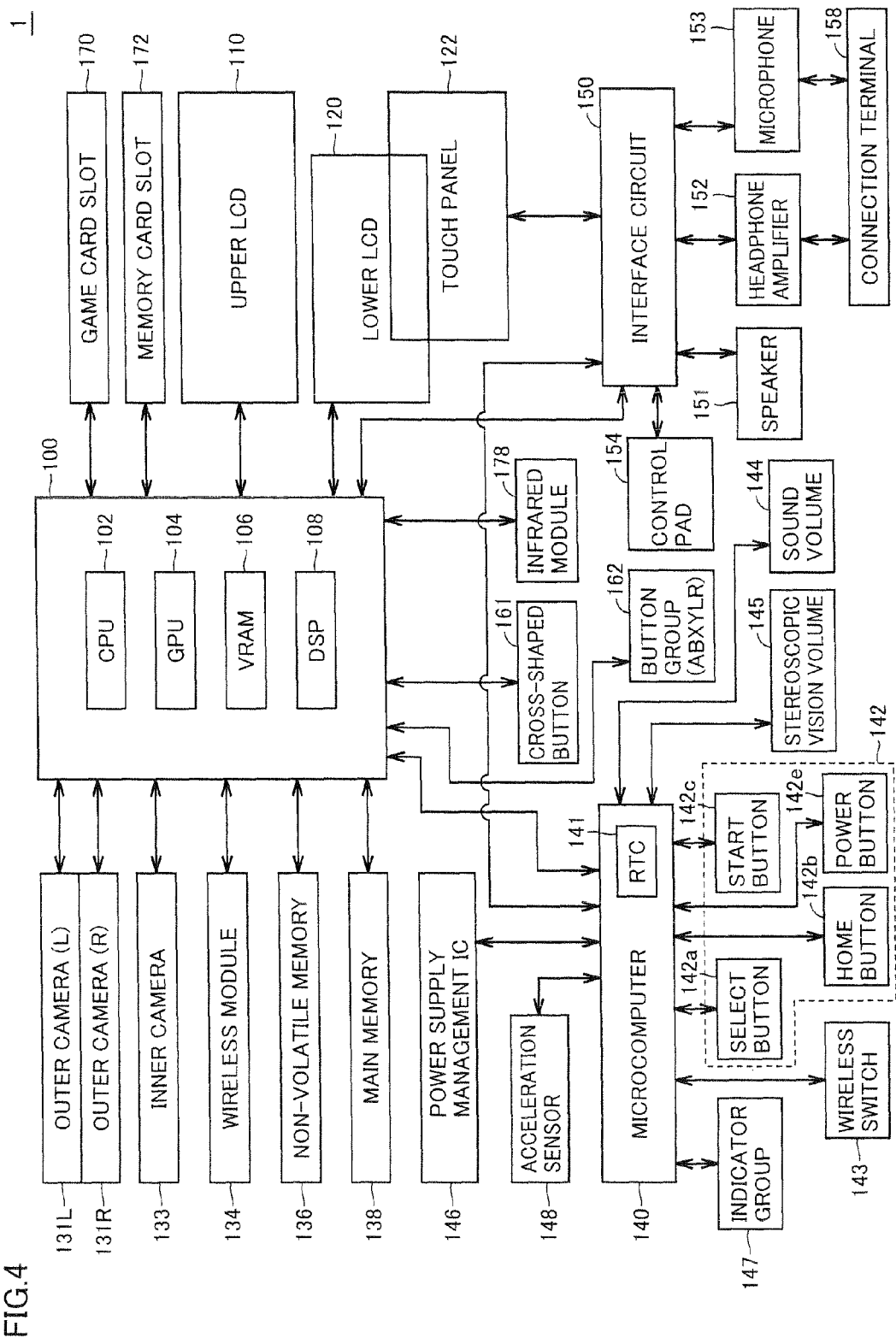
FIG. 4 shows an exemplary non-limiting block diagram showing an electrical configuration of the game device according to an exemplary embodiment.

Referring to FIG. 4, game device 1 includes an operation processing unit 100, upper LCD 110, lower LCD 120, touch panel 122, outer cameras 131L, 131R, inner camera 133, a wireless module 134, a non-volatile memory 136, a main memory 138, a microcomputer 140, button group 142, sound volume 144, stereoscopic vision volume 145, a power supply management IC (Integrated Circuit) 146, indicator group 147, an acceleration sensor 148, an interface circuit 150, speaker 151, a headphone amplifier 152, microphone 153, connection terminal 158, cross-shaped button 161, button group 162, game card slot 170, memory card slot 172, and an infrared module 178. In addition, game device 1 includes a battery and a power supply circuit that are not shown.

Operation processing unit 100 is responsible for overall control of game device 1. Operation processing unit 100 is also a control entity for controlling display on upper LCD 110 and lower LCD 120. More specifically, operation processing unit 100 realizes various types of processing including control of stereoscopic display on upper LCD 110 by executing firmware (an instruction set) stored in advance in non-volatile memory 136, a program (an instruction set) or data read from game card 171 attached to game card slot 170, a program (an instruction set) or data read from memory card 173 attached to memory card slot 172, or the like.

It is noted that, in addition to a case where a program (an instruction set) executed by operation processing unit 100 is provided through game card 171 or memory card 173, a program may be provided to game device 1 through an optical recording medium such as a CD-ROM or a DVD. Moreover, a program may be provided from a server device (not shown) connected through a network.

More specifically, operation processing unit 100 includes a CPU (Central Processing Unit) 102, a GPU (Graphical Processing Unit) 104, a VRAM (Video Random Access Memory) 106, and a DSP (Digital Signal Processor) 108. Processing in each unit will be described later. In addition, operation processing unit 100 exchanges data with each unit.

Each of outer cameras 131L, 131R and inner camera 133 is connected to operation processing unit 100, and outputs an input image obtained as a result of image pick-up to operation processing unit 100 in response to an instruction from operation processing unit 100. Each of these cameras includes image pick-up elements such as CCD (Charge Coupled Device) or CIS (CMOS Image Sensor) and a peripheral circuit for reading image data (input image) obtained by the image pick-up elements.

Wireless module 134 exchanges data with another game device 1 or some information processing apparatus through a wireless signal. By way of example, wireless module 134 communicates data with another device under a wireless LAN scheme complying with such standards as IEEE802.11a/b/g/n.

Non-volatile memory 136 stores firmware or the like necessary for a basic operation of game device 1 and a code describing the firmware is developed on main memory 138. As CPU 102 of operation processing unit 100 executes the code developed on main memory 138, basic processing in game device 1 is realized. In addition, non-volatile memory 136 may store data on various parameters set in advance in game device 1 (pre-set data). By way of example, non-volatile memory 136 is implemented by a flash memory.

Main memory 138 is used as a work area or a buffer area for operation processing unit 100 to perform processing. Main memory 138 temporarily stores a program (a code) or data necessary for processing by operation processing unit 100. By way of example, main memory 138 is implemented by a PSRAM (Pseudo-SRAM).

Microcomputer 140 mainly provides processing involved with a user interface. More specifically, microcomputer 140 is connected to operation processing unit 100 as well as to button group 142, sound volume 144, stereoscopic vision volume 145, power supply management IC 146, indicator group 147, and acceleration sensor 148. Microcomputer 140 senses a user's button operation or the like, outputs the result of sensing to operation processing unit 100, and causes an indicator for notifying the user of various types of information to illuminate, in response to a signal from operation processing unit 100.

In addition, microcomputer 140 has a real time counter (RTC: Real Time Clock) 141. Real time counter 141 is a part providing a time-counting function, and counts time in a predetermined cycle. The result of counting is successively output to operation processing unit 100. Operation processing unit 100 can also calculate the current time (date) or the like based on a count value counted by real time counter 141.

Power supply management IC 146 causes supply of electric power from a power supply (typically, the battery described above) mounted on game device 1 to each unit and controls an amount of supply thereof.

Acceleration sensor 148 detects displacement of game device 1 and the result of detection is output to operation processing unit 100 through microcomputer 140. The result of detection by acceleration sensor 148 is utilized in a program (a game application) executed on game device 1.

Infrared module 178 establishes wireless communication (infrared communication) with another game device 1. Wireless communication established by this infrared module 178 is narrower in coverage than wireless communication through wireless module 134. It is noted that infrared rays which are carrier waves for infrared communication are projected/received through infrared port 179 (see FIG. 3B).

Interface circuit 150 is connected to operation processing unit 100 as well as to speaker 151, headphone amplifier 152, microphone 153, control pad 154, and touch panel 122. More specifically, interface circuit 150 includes an audio control circuit (not shown) for controlling speaker 151, headphone amplifier 152 and microphone 153 and a touch panel control circuit (not shown) for controlling touch panel 122.

Speaker 151 amplifies an audio signal from interface circuit 150 to output voice and sound through sound emission holes 151L and 151R. Headphone amplifier 152 amplifies an audio signal from interface circuit 150 to output voice and sound from a connected headphone. Microphone 153 senses user's voice or the like uttered toward game device 1 to output an audio signal indicating sensed voice to interface circuit 150.

As described above, the audio control circuit constituting interface circuit 150 carries out A/D (analog/digital) conversion of an analog audio signal sensed by microphone 153 to output the resultant digital audio signal to operation processing unit 100, and carries out D/A (digital/analog) conversion of a digital audio signal generated by operation processing unit 100 or the like to output the resultant analog audio signal to speaker 151 and/or a connected headphone.

In addition, the touch panel control circuit constituting interface circuit 150 generates touch position data indicating a position where the user performed an input operation (a pointing operation) in response to a detection signal from touch panel 122 and outputs the data to operation processing unit 100.

Game card slot 170 and memory card slot 172 are each connected to operation processing unit 100. Game card slot 170 reads and writes data from and into attached game card 171 through a connector in response to a command from operation processing unit 100. Memory card slot 172 reads and writes data from and into attached memory card 173 through a connector in response to a command from operation processing unit 100.

Lower LCD 120 and upper LCD 110 each display an image in response to a command from operation processing unit 100. In a typical manner of use of game device 1, an image for accepting various operations is displayed on lower LCD 120 and stereoscopic display is provided on upper LCD 110.

E. CONFIGURATION FOR PROVIDING STEREOSCOPIC DISPLAY

A configuration for providing stereoscopic display in game device 1 according to the present embodiment will now be described.

Figure 5:
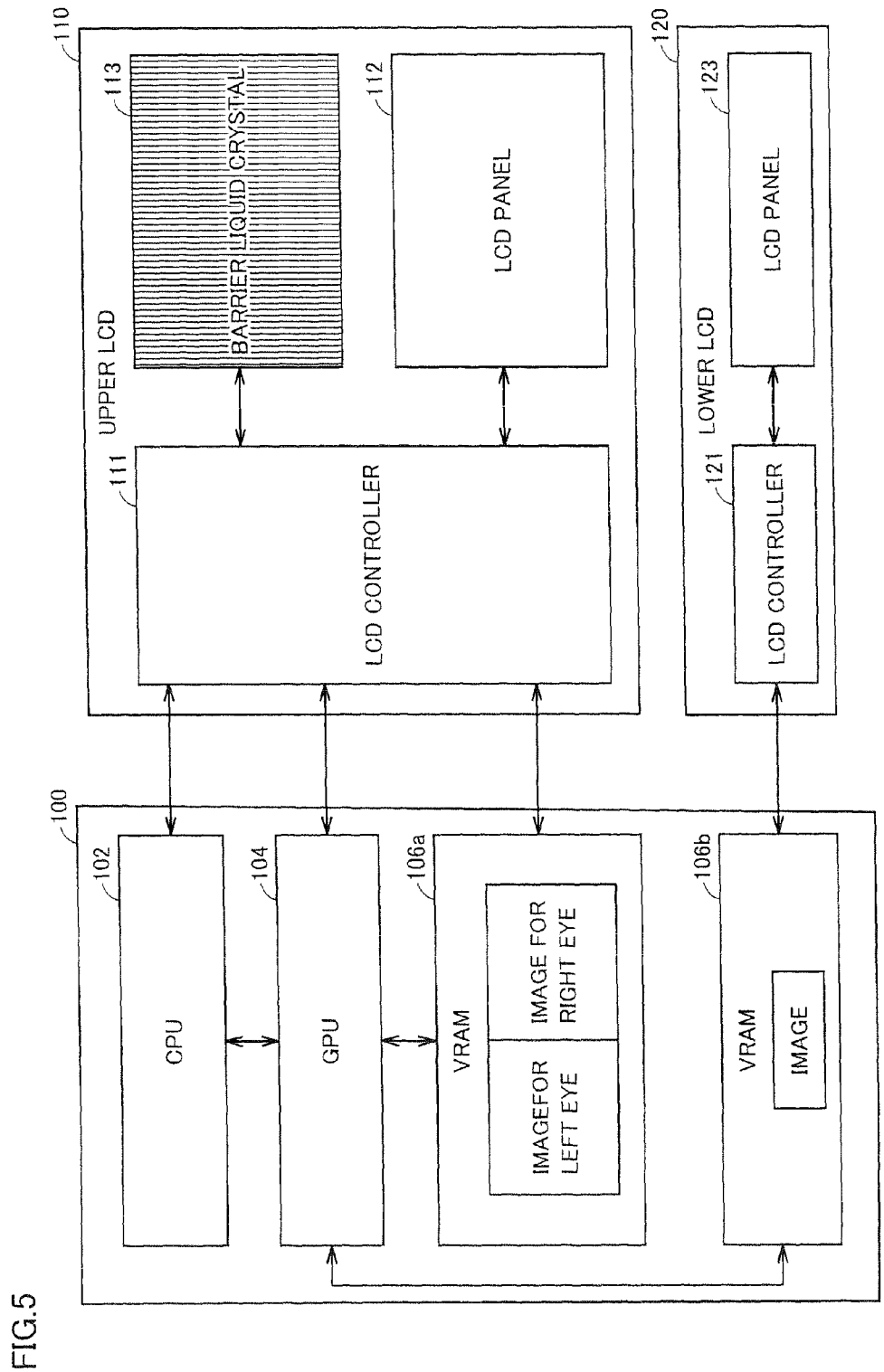
FIG. 5 shows an exemplary non-limiting block diagram showing an electrical configuration for implementing display control in the game device.

Referring to FIG. 5, operation processing unit 100 includes GPU 104 for mainly performing processing for displaying images on upper LCD 110 and lower LCD 120 respectively (image processing), in addition to CPU 102. GPU 104 has a processing circuit specialized for image processing and successively generates images to be displayed on upper LCD 110 and lower LCD 120 respectively in response to a command from CPU 102. These images are transferred to a VRAM 106a for upper LCD 110 and a VRAM 106b for lower LCD 120 respectively.

Here, a pair of images (an image for left eye and an image for right eye) for stereoscopic display on upper LCD 110 is written in VRAM 106a independently of each other. In contrast, since two-dimensional display (non-stereoscopic display) is provided on lower LCD 120, a single image is written in VRAM 106b.

Upper LCD 110 includes an LCD controller 111, an LCD panel 112, and a barrier liquid crystal 113. In contrast, lower LCD 120 includes an LCD controller 121 and an LCD panel 123.

A structure of upper LCD 110 is further described.

FIG. 6 shows a structure of a parallax barrier type liquid crystal display device as a typical example of upper LCD 110. Upper LCD 110 includes LCD panel 112 arranged between a glass substrate 118 and a glass substrate 119.

LCD panel 112 includes a left eye pixel group 112L and a right eye pixel group 112R. A not-shown backlight is provided on a side of glass substrate 118 opposite to glass substrate 119 and light from this backlight is emitted toward left eye pixel group 112L and right eye pixel group 112R. Left eye pixel group 112L and right eye pixel group 112R function as a spatial light modulator for adjusting light from the backlight. Here, each pixel in left eye pixel group 112L and each pixel in right eye pixel group 112R are alternately arranged.

Barrier liquid crystal 113 representing a parallax optical system is provided on a side opposite to the side where glass substrate 118 is in contact with left eye pixel group 112L and right eye pixel group 112R. In this barrier liquid crystal 113, a plurality of slits 114 are provided in rows and columns at prescribed intervals. Left eye pixel group 112L and right eye pixel group 112R are arranged symmetrically to each other, with an axis passing through a central position of each slit 114 and perpendicular to a surface of glass substrate 118 serving as the reference. By appropriately designing positional relation with the slit, of each set of left eye pixel group 112L and right eye pixel group 112R brought in correspondence with each slit, the user visually recognizes only left eye pixel group 112L with his/her left eye and visually recognizes only right eye pixel group 112R with his/her right eye.

Each slit 114 included in barrier liquid crystal 113 restricts a field of view of each of the user's right and left eyes to a corresponding angle. Consequently, only left eye pixel group 112L is present in a line of sight AXL of the user's left eye, while only right eye pixel group 112R is present in a line of sight AXR of the user's right eye.

Here, by causing left eye pixel group 112L and right eye pixel group 112R to display a pair of images having prescribed parallax, an image having prescribed parallax can be presented to the user. By displaying such a pair of images having prescribed parallax, the user feels as if he/she stereoscopically viewed an object. Hereinafter, a surface of barrier liquid crystal 113 on the user side, that is, a surface on which this image is actually displayed, is also referred to as a display surface (of upper LCD 110).

More specifically, as shown in FIG. 5, GPU 104 successively writes an image for left eye and an image for right eye, by designating an address in VRAM 106a. LCD controller 111 successively reads image data in each column from the address of interest in VRAM 106a such that images in the direction of column constituting the image for left eye and the image for right eye written in VRAM 106a are alternately displayed in alignment on LCD panel 112, and drives LCD panel 112.

It is noted that upper LCD 110 can also provide two-dimensional display, that is, non-stereoscopic display, of an image. In this case, a method of inactivating barrier liquid crystal 113 and a method of setting parallax between the image for left eye and the image for right eye used for display to substantially zero, by providing a command to LCD controller 111, are available.

In the case of the former method, since a plurality of slits 114 provided in barrier liquid crystal 113 are inactivated, light from left eye pixel group 112L and right eye pixel group 112R is substantially incident on the user's left and right eyes. In this case, resolution for the user is substantially twice as high as resolution in stereoscopic display.

In the case of the latter method, since the image visually recognized by the user's left eye and the image visually recognized by the user's right eye are substantially equally controlled, the user visually recognizes the same image with his/her left and right eyes.

Meanwhile, non-stereoscopic display is provided on lower LCD 120. GPU 104 successively writes an image to be displayed, by designating an address in VRAM 106b, and LCD controller 121 successively reads images written in VRAM 106b and drives LCD panel 123.

Though a parallax barrier type display device has been exemplified in FIG. 6 by way of a typical example of a display portion capable of providing stereoscopic display, for example, a lenticular type display device or the like may also be adopted. According to such a type, a display area for an image for left eye and a display area for an image for right eye are arranged in a certain pattern (typically, alternately).

It is noted that such a form that an image for left eye and an image for right eye are alternately displayed with a display area for the image for left eye and a display area for the image for right eye being common may be adopted, as in the method of utilizing shutter glasses (time-division type).

F. IMPLEMENTATION OF STEREOSCOPIC DISPLAY/TWO-DIMENSIONAL DISPLAY

Referring to FIGS. 7A, 7B, 8A, and 8B, an implementation of stereoscopic display of an object on upper LCD 110 and two-dimensional display of an object on lower LCD 120 will now be described. As a typical implementation on a game device, a method of generating an image by (virtually) picking up an image of an object arranged in a three-dimensional virtual space with a virtual camera and displaying this generated image will be described below.

Figure 7A:
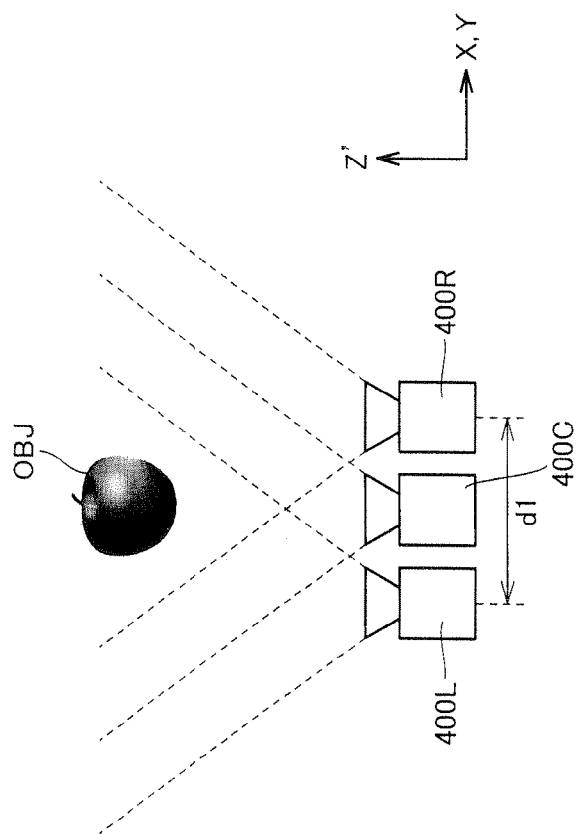
FIGS. 7A and 7B show exemplary non-limiting diagrams each for illustrating one example of a method of generating an image used for display control in the game device.

Referring to FIG. 7A, an "apple" is arranged as an object OBJ in a three-dimensional virtual space, and a pair of images (an image for left eye PIMGL and an image for right eye PIMGR) for stereoscopic display of the "apple" on upper LCD 110 is generated by picking up images of this "apple" with a pair of virtual cameras (a left virtual camera 400L and a right virtual camera 400R). In addition, a single image (an image PIMGC for two-dimensional display) for two-dimensionally displaying the "apple" on lower LCD 120 is generated by picking up an image of this "apple" with a single virtual camera 400C (typically, arranged at a position intermediate between left virtual camera 400L and right virtual camera 400R).

It is assumed that the pair of virtual cameras (left virtual camera 400L and right virtual camera 400R) is arranged in alignment in a horizontal direction (hereinafter referred to as an X direction) in the three-dimensional virtual space. Here, a vertical direction is referred to as a Y direction, and a camera direction of each virtual camera (a direction of an optical axis of image pick-up) is referred to as a Z' direction. It is noted that the X direction and the Y direction in the three-dimensional virtual space correspond to the horizontal direction (X direction) and the vertical direction (Y direction) of the display surface, respectively. In addition, the Z' direction in the three-dimensional virtual space corresponds to a value of depth of an object. A position of each object in the Z' direction (a value of depth) determines a stereo depth when it is stereoscopically displayed. Namely, an object arranged at a position more distant (a greater value of depth) from a reference object (having a value of depth of "0") is displayed with greater stereo depth. By thus setting a value of depth, when a pair of images (image for left eye PIMGL and image for right eye PIMGR) picked up by the pair of virtual cameras is used for stereoscopic display, an object greater in value of depth in the three-dimensional virtual space has a relatively greater stereo depth.

Namely, an absolute value of a stereo depth of each stereoscopically displayed object is determined by a position in the Z' direction (value of depth) in the three-dimensional virtual space and a distance d1 between the pair of virtual cameras.

Figure 7B:
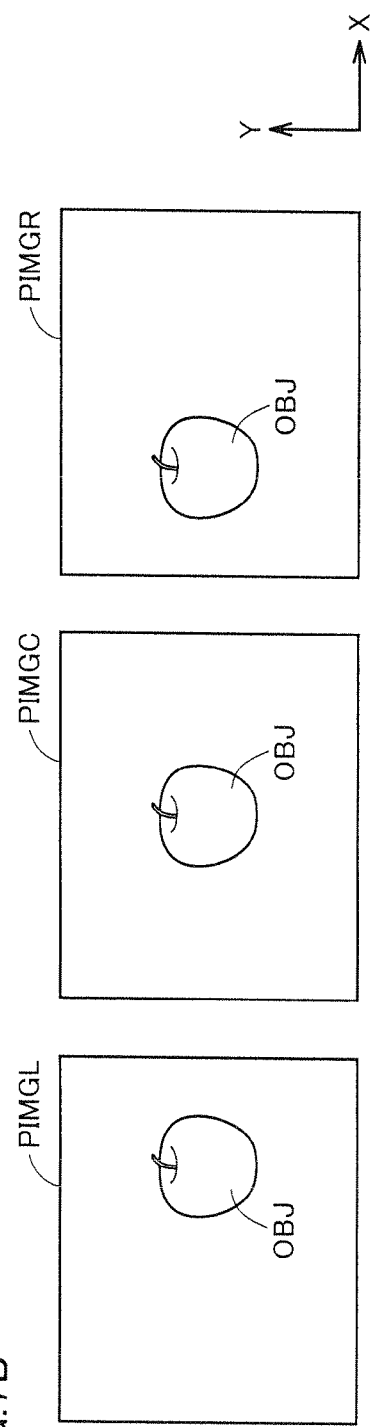

A pair of images shown in FIG. 7B (image for left eye PIMGL and image for right eye PIMGR) is displayed in substantially the same display region. Namely, according to the lenticular type as shown in FIG. 6, a pixel for left eye and a pixel for right eye are alternately arranged so that image for left eye PIMGL and image for right eye PIMGR of interest are spatially alternately displayed in a lateral direction of the display surface. Alternatively, according to shutter glasses (time-division type), image for left eye PIMGL and image for right eye PIMGR of interest are temporally alternately displayed as the same display surface is temporally divided.

Therefore, a region in the pair of images (image for left eye PIMGL and image for right eye PIMGR) shown in FIG. 7B where parallax is zero looks like being present at the display surface when viewed from the user. Namely, by setting parallax of a target region to zero, the user feels that an object included in that region is located on or around the display surface of upper LCD 110.

Meanwhile, image PIMGC for two-dimensional display shown in FIG. 7B is displayed in its entirety on lower LCD 120. Therefore, when viewed from the user, normal two-dimensional display is provided.

A stereo depth (a position in a direction of depth, that is, an amount of pop-up or an amount of recess) of an object stereoscopically displayed on upper LCD 110 is varied depending on distance d1 between the pair of virtual cameras (left virtual camera 400L and right virtual camera 400R). Namely, as distance d1 between the pair of virtual cameras is greater, difference between image pick-up ranges (fields of view) of the respective virtual cameras is greater and hence parallax generated between the pair of images (image for left eye PIMGL and image for right eye PIMGR) is also greater.

More specifically, as shown in FIG. 8A, when positional relation between the pair of virtual cameras (left virtual camera 400L and right virtual camera 400R) is changed in a direction to increase parallax regarding object OBJ, the user feels that object OBJ is present closer toward the user side, relative to the display surface of upper LCD 110. So to speak, the user visually recognizes an object image of object OBJ as if it "popped up" from the display surface.

In contrast, as shown in FIG. 8B, when positional relation between the pair of virtual cameras (left virtual camera 400L and right virtual camera 400R) is changed in a direction to decrease parallax regarding object OBJ, the user feels that object OBJ is present on a side opposite to the user, relative to the display surface of upper LCD 110. So to speak, the user visually recognizes an object image of object OBJ as if it were "recessed" in the display surface.

By thus changing positional relation between the pair of virtual cameras (left virtual camera 400L and right virtual camera 400R), a stereo depth visually recognized by the user can be adjusted as appropriate.

As an alternative method, by fixing positional relation between the pair of virtual cameras (left virtual camera 400L and right virtual camera 400R), obtaining the pair of picked-up images (image for left eye PIMGL and image for right eye PIMGR), and changing relative display positions of the pair of images on the display surface of upper LCD 110, a stereo depth visually recognized by the user can also be adjusted. In addition, by changing both of positional relation between the pair of virtual cameras (left virtual camera 400L and right virtual camera 400R) and relative display positions of the pair of images (image for left eye PIMGL and image for right eye PIMGR), a stereo depth visually recognized by the user may be adjusted as appropriate.

G. APPLICATION

Referring next to FIGS. 9A to 9C, 10A, and 10B, a function to control display of an object provided by the display control program according to the present embodiment will be described.

Figure 9A:
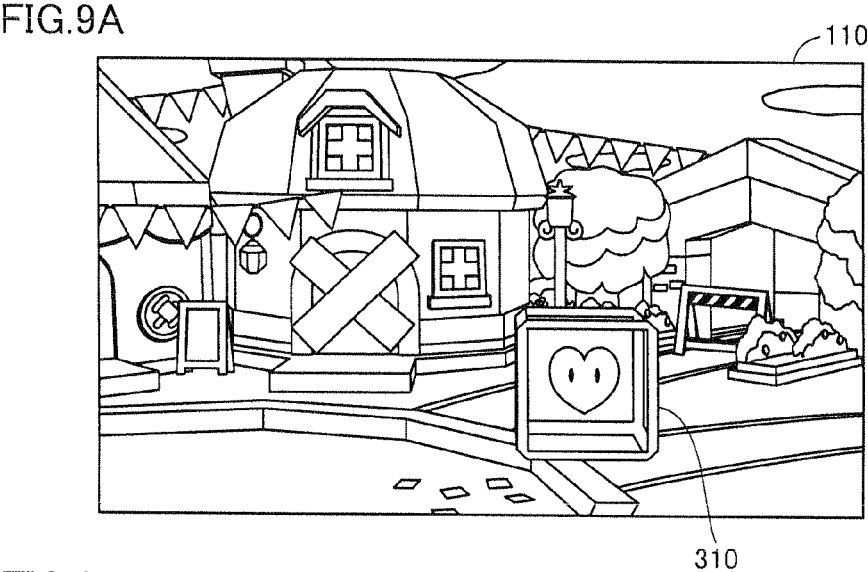
FIGS. 9A to 9C show exemplary non-limiting diagrams each showing one example of a user interface provided in the game device.
Figure 9B:
Figure 9C:
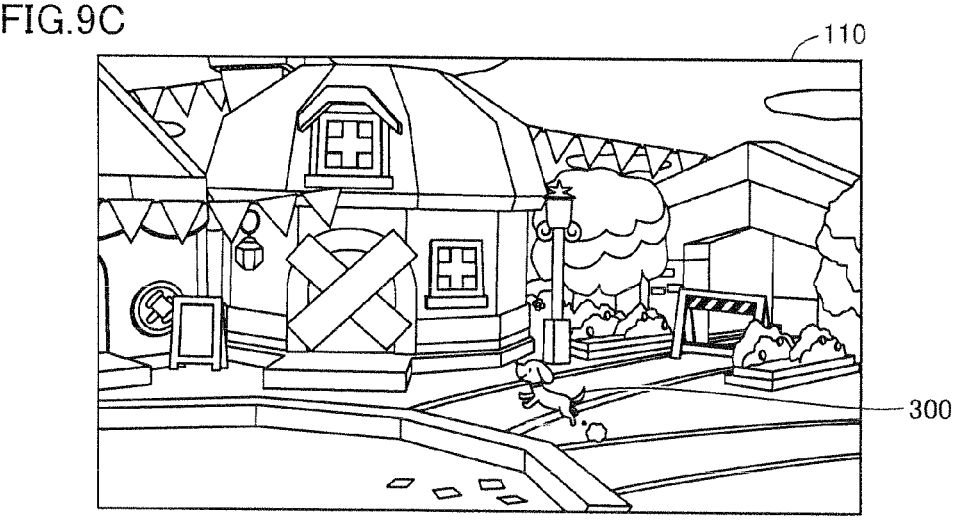

FIGS. 9A to 9C each show a game in which the user operates the input portion of game device 1 to move a user character 300, to thereby experience various adventures or the like, by way of example of an application including a display control function according to the present embodiment. It is assumed in this game that various objects are arranged in a virtual world and contents displayed (rendered) on the display are successively varied in accordance with a position of user character 300. As will be described later, as a typical method for realizing such display, an object of interest is arranged in the virtual space and user character 300 is arranged at a position in accordance with the user's operation. Then, the virtual camera arranged in coordination with the position of user character 300 is used to pick up an image of the object in the virtual space, thus generating an image used for display.

As described above, in a case where upper LCD 110 capable of providing stereoscopic display stereoscopically displays these images, a pair of virtual cameras is used for image pick-up so that an image for left eye and an image for right eye are generated and a pair of these images (stereo images) is output to upper LCD 110. Thus, the user can stereoscopically visually recognize the object with a stereo depth (stereoscopic effect) dependent on distance d1 between the virtual cameras.

FIGS. 9A to 9C each exemplify a state of display of one scene of the game on upper LCD 110. It is assumed in this game shown in FIGS. 9A to 9C that user character 300 moves over the ground in the virtual world and an object 310 showing an item is present at a position higher than this ground in a "floating state". FIG. 9A shows this floating object 310. It is assumed in the state shown in FIG. 9A that object 310 is present at a position closer to the virtual camera in the virtual space and user character 300 is present in the rear of object 310. Therefore, when viewed from the virtual camera, user character 300 is located behind object 310 and it is not displayed. In addition, object 310 looks like popping up toward the front from the display surface of upper LCD 110.

FIG. 9B shows such a state that user character 300 moved further in the rear in the virtual world, from the state shown in FIG. 9A. In this state shown in FIG. 9B, object 310 in the virtual space is further closer to the virtual camera. Therefore, if object 310 is stereoscopically displayed as it is, it is displayed with an amount of pop-up greater than a stereo depth (an amount of pop-up) in FIG. 9A.

With the display control function according to the present embodiment, when a stereo depth (an amount of pop-up) of the object that appears when stereoscopic display as such is provided exceeds a prescribed value, the object is not stereoscopically displayed as it is but it is moved out of the effective display range to be set to a not-displayed state. Namely, from the state where object 310 is present in a floating manner as shown in FIG. 9A, object 310 moves downward in the screen as shown in FIG. 9B and it is no longer displayed as shown in FIG. 9C.

On the other hand, if user character 300 returns toward the front in the virtual world and a stereo depth (an amount of pop-up) produced when object 310 is stereoscopically displayed is smaller than a prescribed value, object 310 is displayed at its original display position. Here, contrary to the operations in FIGS. 9A to 9C, such an effect that object 310 moves from an outer peripheral side of the screen toward a central portion is provided.

Figure 10A:
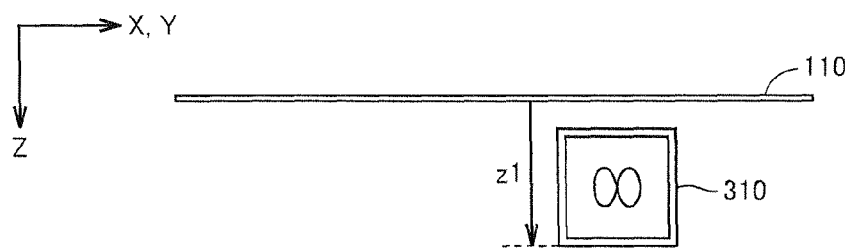
FIGS. 10A and 10B show exemplary non-limiting diagrams each for illustrating a stereo depth (an amount of pop-up) of an object shown in FIGS. 9A to 9C.
Figure 10B:
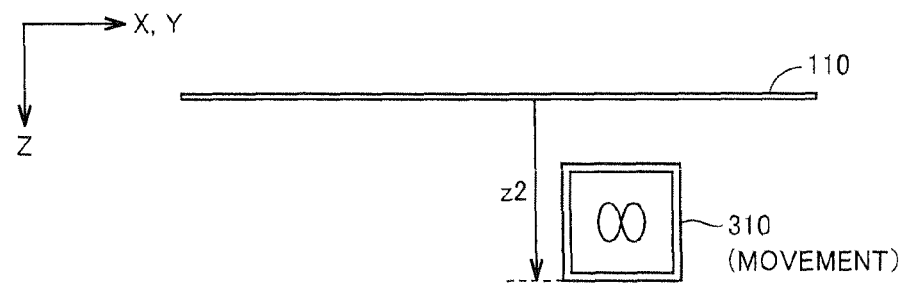

Description of a stereo depth (an amount of pop-up) of object 310 is given here. Object 310 in the state shown in FIG. 9A looks like popping up toward the front by a distance z1 from the display surface of upper LCD 110, as shown in FIG. 10A. On the other hand, object 310 in the state shown in FIG. 9B looks like popping up toward the front by a distance z2 (>z1) from the display surface of upper LCD 110 as shown in FIG. 10B. In this case, object 310 moves out of the effective display range while keeping this distance z2. Alternatively, in a case where object 310 is displayed again as well, object 310 is displayed as moving, while keeping a stereo depth (an amount of pop-up).

Thus, in any of a case where object 310 is moved out of the effective display range to be set to a not-displayed state and a case where not-displayed object 310 is displayed and moved to a display position, a stereo depth (an amount of pop-up) that appears in object 310 is basically maintained. Such adjustment of a stereo depth (an amount of pop-up) is made by adjusting parallax of object 310 between the image for left eye and the image for right eye output on upper LCD 110. Thus, a stereo depth (an amount of pop-up) in stereoscopic display of object 310 can appropriately be kept.

Namely, game device 1 according to the present embodiment calculates parallax produced when object 310 is displayed on upper LCD 110 (display). This parallax indicates a degree of a stereo depth (an amount of pop-up) of object 310. Then, game device 1 carries out at least one of movement of displayed object 310 out of the effective display range to set the object to a not-displayed state and setting of not-displayed object 310 to a displayed state followed by movement of object 310 to its original display position, in accordance with the calculated parallax. Here, the image for left eye and the image for right eye are generated to substantially maintain parallax produced in a moving object.

It is expected in many cases that a position of user character 300 is varied little by little by the user's operation. In order to prevent switching between display and non-display of object 310 and movement from being frequently repeated by such an operation, a condition for a stereo depth (an amount of pop-up) in changing displayed object 310 to a not-displayed state is preferably different from a condition for a stereo depth (an amount of pop-up) in displaying not-displayed object 310.

Namely, game device 1 moves a displayed object out of the effective display range in response to the fact that parallax produced in the object satisfies a first condition, and moves a not-displayed object into the effective display range in response to the fact that parallax produced when the not-displayed object is displayed on upper LCD 110 (display) satisfies a second condition different from the first condition. More specifically, game device 1 sets object 310 in a not-displayed state in response to the fact that a stereo depth (parallax between the image for left eye and the image for right eye) produced in displayed object 310 exceeds a first prescribed value, whereas game device 1 displays object 310 in response to the fact that parallax produced when not-displayed object 310 is displayed on upper LCD 110 (display) is smaller than a second prescribed value smaller than the first prescribed value.

H. AS TO IMAGE GENERATION PROCESSING FOR STEREOSCOPIC VISION

Image generation processing for realizing an effect in connection with object 310 as described above will be described with reference to FIGS. 11 and 12.

Figure 11:
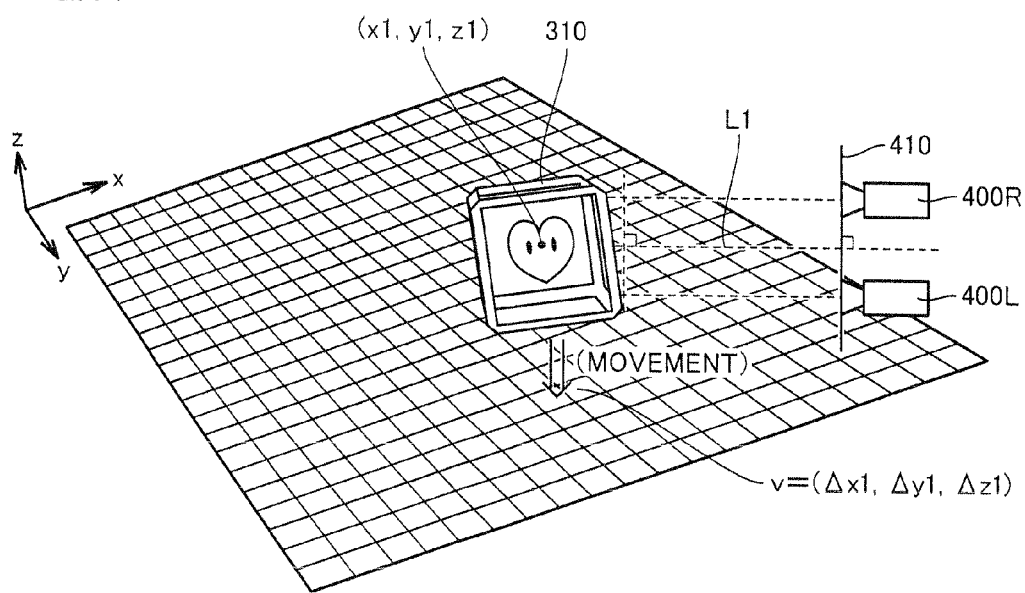
FIGS. 11 and 12 show exemplary non-limiting diagrams each for illustrating image generation processing for providing stereoscopic display in the game device.

Referring to FIG. 11, object 310 is arranged in the virtual space (an xyz coordinate system) and the pair of virtual cameras (left virtual camera 400L and right virtual camera 400R) is used to pick up images of object 310. It is assumed that various objects necessary for the game shown in FIGS. 9A to 9C are arranged in the virtual space. As the pair of virtual cameras picks up an image of object 310, the image for left eye and the image for right eye are generated. It is noted that a position of the pair of virtual cameras in the virtual space successively changes in response to the user's operation. In the example of the game shown in FIGS. 9A to 9C, the position of the pair of virtual cameras is also updated in accordance with the position of user character 300, and consequently relative positional relation between the pair of virtual cameras and object 310 is also successively updated.

Parallax produced when object 310 is stereoscopically displayed on upper LCD 110 (display) as described above can be defined by relative positional relation between the pair of virtual cameras and object 310 in the virtual space shown in FIG. 11. More specifically, parallax when object 310 is stereoscopically displayed on upper LCD 110 is in inverse proportion to a distance L1 between the pair of virtual cameras and object 310. Namely, as distance L1 is smaller, parallax produced in object 310 stereoscopically displayed on upper LCD 110 becomes greater.

Therefore, in the present embodiment, as one method for evaluating (calculating) parallax produced in object 310 stereoscopically displayed on upper LCD 110, magnitude of distance L1 between the pair of virtual cameras and object 310 is made use of.

Naturally, instead of such a distance between the pair of virtual cameras and object 310 in the three-dimensional virtual space, another method can also be used to evaluate (calculate) parallax. For example, parallax can also be evaluated (calculated) based on a distance of object 310 from a plane on the three-dimensional virtual space where parallax produced in stereoscopic display is zero. Alternatively, parallax can also be evaluated (calculated) based on an amount of displacement (an amount of pixels) between the image for left eye and the image for right eye displayed on upper LCD 110. Alternatively, parallax can also be evaluated (calculated) based on a distance between left virtual camera 400L and right virtual camera 400R in the three-dimensional virtual space.

In the present embodiment, in a case where object 310 is to be switched between display and non-display as described above, in order to evaluate parallax produced when object 310 is stereoscopically displayed on upper LCD 110, distance L1 between the pair of virtual cameras and object 310 (that is, parallax when object 310 is stereoscopically displayed on upper LCD 110) is sequentially calculated. This distance L1 means a distance on the normal to a reference plane 410 including an image pick-up plane of left virtual camera 400L and an image pick-up plane of right virtual camera 400R.

Then, by comparing a distance from reference plane 410 which is a plane including the pair of virtual cameras within the virtual space to object 310 with a prescribed value, processing for moving the displayed object out of the effective display range and/or processing for moving a not-displayed object into the effective display range are/is performed.

Figure 12:
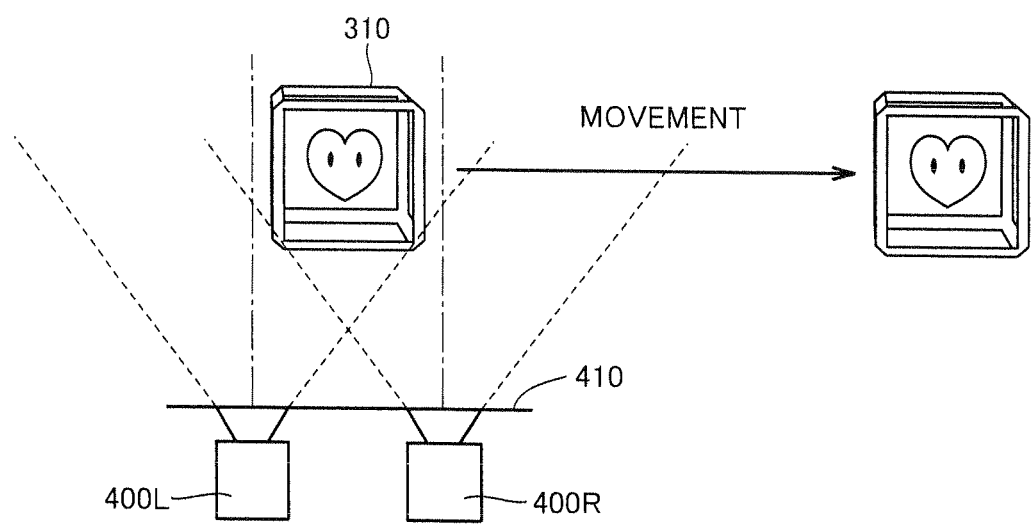

More specifically, when parallax produced in stereoscopically displayed object 310 is equal to or greater than a prescribed value, that is, when distance L1 from reference plane 410 to object 310 is equal to or smaller than a predetermined value (hereinafter also referred to as a "criterion value A" involved with switching from a display state to a non-display state), object 310 is moved out of an image pick-up range of the pair of virtual cameras as shown in FIGS. 11 and 12.

A direction of movement of object 310 is set to a direction in parallel to reference plane 410, in order to maintain a stereo depth (parallax between the image for left eye and the image for right eye) produced in moving object 310 stereoscopically displayed on upper LCD 110. Namely, by moving object 310 in an orientation in parallel to reference plane 410 in the virtual space, object 310 is displayed as moving.

More specifically, assuming an arbitrary vector in parallel to reference plane 410 in the virtual space as v=($\Delta$x1, $\Delta$y1, $\Delta$z1), object 310 present at a coordinate value (x1, y1, z1) moves to a coordinate value (x1+k×$\Delta$x1, y1+k×$\Delta$x1, z1+k×$\Delta$x1). It is noted that a multiplier k is a coefficient for moving object 310 out of the image pick-up range of the pair of virtual cameras and a position of object 310 is successively updated by changing this value over time.

In other words, vector v is a vector orthogonal to each camera direction of left virtual camera 400L and right virtual camera 400R. Vector v can take any orientation so long as it is in parallel to reference plane 410, however, an orientation of vector v may be determined in accordance with a position or the like of object 310 on the display surface of upper LCD 110 as will be described later.

On the other hand, in switching not-displayed object 310 to a display state, determination is made based on a position of object 310 (a coordinate value) before switching to a not-displayed state. Namely, regarding object 310 that has been present at a coordinate value (x1, y1, z1), parallax produced when object 310 is displayed is evaluated based on distance L1 from reference plane 410 to its original coordinate value (x1, y1, z1).

More specifically, when parallax produced when object 310 is stereoscopically displayed is equal to or smaller than a prescribed value, that is, when distance L1 from reference plane 410 to an original position of object 310 is equal to or greater than a predetermined value (hereinafter also referred to as a "criterion value B" involved with switching from a non-display state to a display state (criterion value B>criterion value A)), object 310 moves into the image pick-up range of the pair of virtual cameras.

Here, object 310 moves from a coordinate value (x1+k×$\Delta$x1, y1+k×$\Delta$x1, z1+k×$\Delta$x1) to a coordinate value (x1, y1, z1) such that a stereo depth (parallax between the image for left eye and the image for right eye) produced in moving object 310 stereoscopically displayed on upper LCD 110 is maintained, by gradually (continuously) moving object 310 in accordance with vector v in parallel to reference plane 410.

As described above, vector v is a vector in a direction in parallel to reference plane 410 and reference plane 410 is determined depending on a position and/or an orientation (a direction of point of view) of the pair of virtual cameras.

Therefore, in a case where not-displayed object 310 is switched to a display state and moved, vector v dependent on reference plane 410 immediately before start of movement is determined and then trace of object 310 is determined. Therefore, a coordinate value of object 310 after it is moved out of the image pick-up range of the pair of virtual cameras does not basically have to be held.

Naturally, such processing as holding a coordinate value after object 310 is moved may be included, however, in this case, a coordinate value after object 310 is moved should sequentially be updated each time reference plane 410 is updated.

Strictly speaking, when a position and/or an orientation (a direction of point of view) of the pair of virtual cameras are/is varied during movement of object 310, reference plane 410 also varies. Therefore, an orientation of movement of object 310 (vector v) should also be updated to a value different from an initial value at the time of start of movement of object 310. Otherwise, parallax produced when moving object 310 is displayed on upper LCD 110 (display) is not maintained constant.

Therefore, vector v may sequentially be updated depending on a position and/or an orientation (a direction of point of view) of the pair of virtual cameras and a position of object 310 may sequentially be updated with the use of most recent vector v.

In a case where a time period during which object 310 is displayed as moving is relatively short, however, vector v calculated at the time of start of movement may be used to calculate trace until completion of movement. In this case, though parallax produced when moving object 310 is displayed on upper LCD 110 (display) may slightly fluctuate, influence on the user is ignorable, provided that the time period required for movement of object 310 is relatively short.

Thus, the description as "substantially" maintaining parallax produced in the moving object according to the present embodiment is a concept encompassing a case where parallax in stereoscopically displayed object 310 is strictly maintained constant and a case where parallax in stereoscopically displayed object 310 may fluctuate under the influence of variation in position and/or orientation of the pair of virtual cameras.

I. EXAMPLE OF MOVEMENT OF OBJECT

An example of movement of object 310 will now be described with reference to FIGS. 13A, 13B and 14.

Figure 13A:
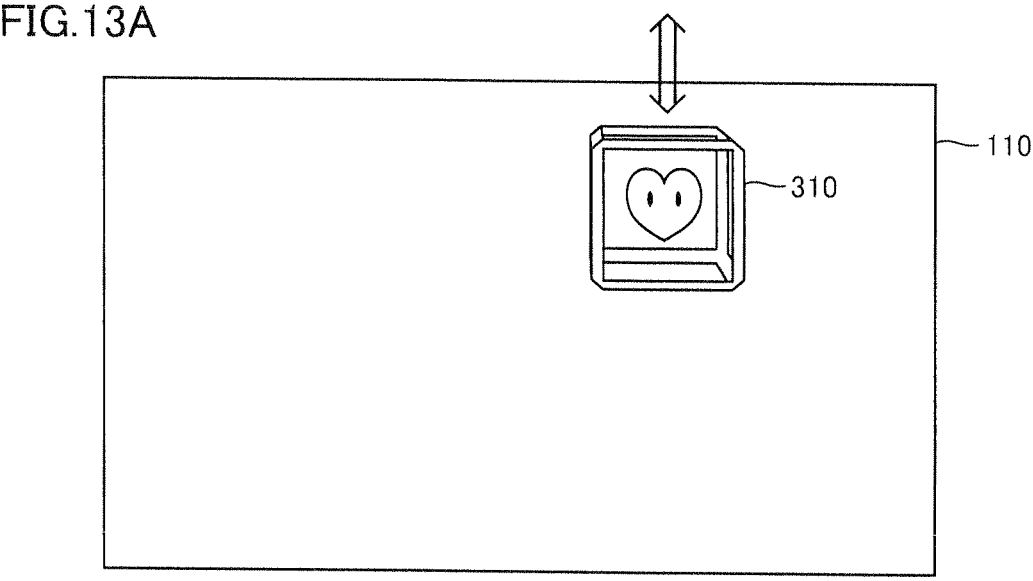
FIGS. 13A and 13B show exemplary non-limiting diagrams each for illustrating an example of movement of an object.
Figure 13B:
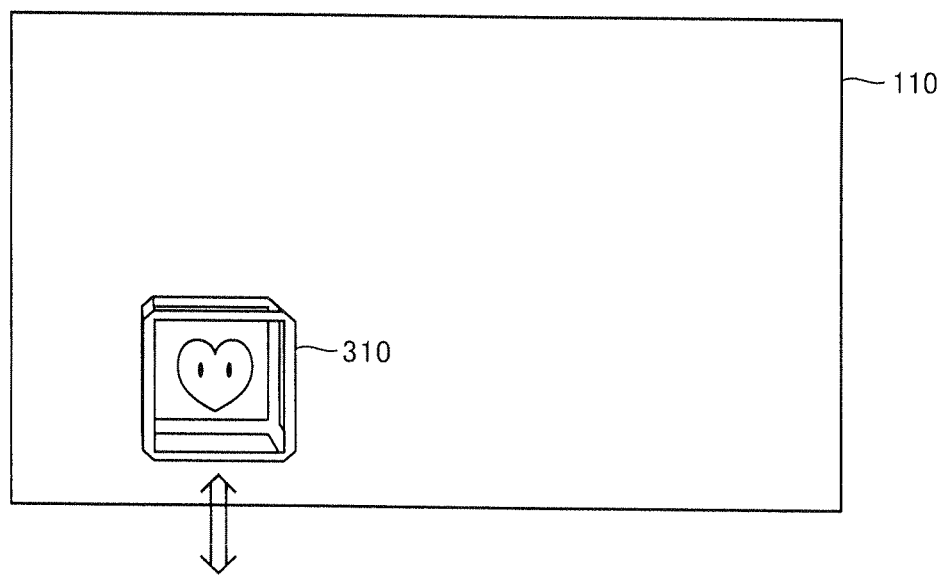
Figure 14:
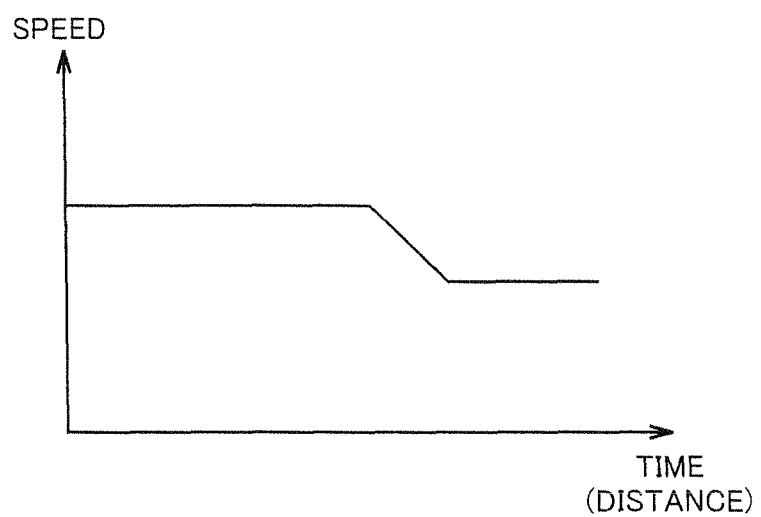
FIG. 14 shows an exemplary non-limiting diagram for illustrating a moving speed of an object.

Referring to FIGS. 13A and 13B, an orientation of movement of object 310 may be different, depending on a display position of object 310 on the display surface of upper LCD 110 (display). Specifically, when object 310 is present in an upper portion of the display surface as shown in FIG. 13A, it may be moved toward an upper side of a screen. On the other hand, when object 310 is present in a lower portion of the display surface as shown in FIG. 13B, it may be moved toward a lower side of the screen. In any case, after switching from non-display to display, the object moves over the same path in an opposite direction.

It is noted that a direction of movement of object 310 may be a vertical direction on the screen or a lateral direction on the screen, however, in a case where a lenticular type display device is adopted, the vertical direction on the screen is preferred.

Alternatively, an orientation of movement of object 310 may be different in accordance with a distance from a display position of object 310 to the outside of the effective display range. Namely, in the example shown in FIG. 13A again, since a distance from object 310 to the upper side of the screen is shortest, object 310 moves in a direction in which this travel distance is shortest. Similarly, in the example shown in FIG. 13B, since a distance from object 310 to the lower side of the screen is shortest, object 310 moves in a direction in which this travel distance is shortest.

Thus, object 310 may be moved in an orientation in which a travel distance from a display position of object 310 to the outside of the effective display range is shortest.

It is noted that object 310 may be moved at a constant speed or in some kind of movement pattern (a speed pattern). For example, as shown in FIG. 14, a moving speed of object 310 may be varied as time lapses or in accordance with a traveled distance. By varying such a moving speed of object 310, a higher effect can be obtained.

A pattern in connection with an orientation or a speed of movement of object 310 as described above may be set in common to all objects or it may be set for each object in accordance with a shape, a size or the like of object 310.

J. FUNCTIONAL BLOCK

Figure 15:
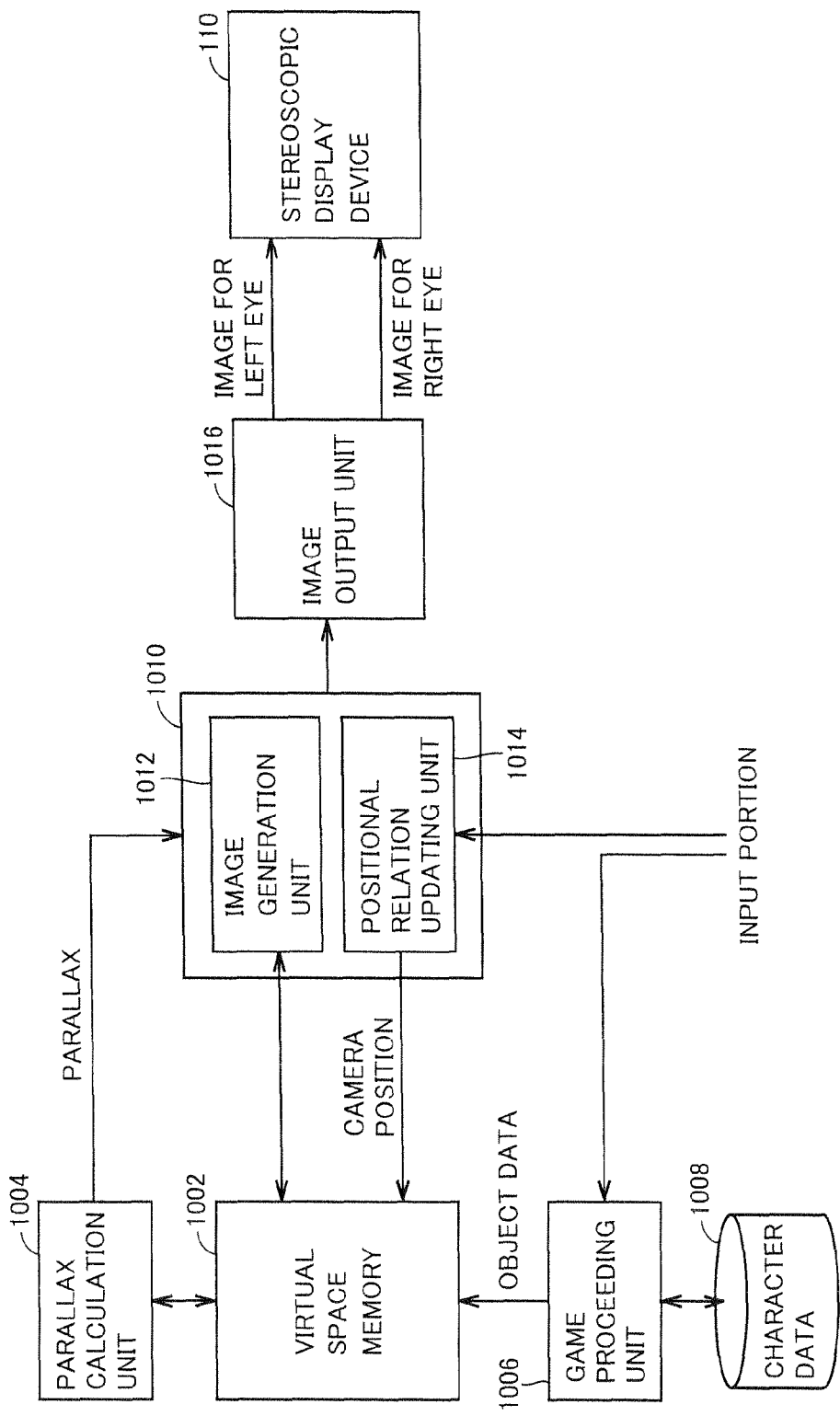
FIG. 15 shows an exemplary non-limiting block diagram of a function implemented in the game device.

A functional block implemented in game device 1 according to an exemplary embodiment will be described with reference to FIG. 15. Each functional block shown in FIG. 15 is implemented as a result of reading and execution of a display control program stored in game card 171 or the like by operation processing unit 100 (CPU 102). Namely, this display control program controls upper LCD 110 (display) capable of providing stereoscopic display.

Referring to FIG. 15, operation processing unit 100 includes as its functions, a virtual space memory 1002, a parallax calculation unit 1004, a game proceeding unit 1006, a movement-and-display unit 1010, and an image output unit 1016. In addition, a character data storage portion 1008 is formed in non-volatile memory 136 or main memory 138 (FIG. 4) of game device 1.

Virtual space memory 1002 is a feature for realizing a virtual space as shown in FIG. 11 and it holds information on an object or a pair of virtual cameras arranged in the virtual space.

Parallax calculation unit 1004 calculates parallax produced when each object is displayed on upper LCD 110 (display). Parallax calculation unit 1004 calculates parallax based on a distance from the reference plane which is a plane including the pair of virtual cameras in the virtual space to the object. More specifically, parallax calculation unit 1004 refers to virtual space memory 1002, obtains information on a position and a size of the arranged object and information on the set pair of virtual cameras, and calculates a distance from the pair of virtual cameras to the object, that is, parallax, based on such information. Parallax calculation unit 1004 outputs the calculated parallax to movement-and-display unit 1010.

Game proceeding unit 1006 proceeds with the game in response to the user's operation through the input portion. Specifically, contents in the object arranged in the virtual space are changed, a new object is arranged, or an object is deleted from the virtual space. Game proceeding unit 1006 selectively reads character data stored in character data storage portion 1008 and writes the data in virtual space memory 1002. This character data includes information or the like on each object.

Movement-and-display unit 1010 carries out at least one of movement of the displayed object out of the effective display range and movement of the not-displayed object into the effective display range as described above, in accordance with the parallax calculated by parallax calculation unit 1004. Movement-and-display unit 1010 moves the object such that parallax produced in the moving object is substantially maintained. More specifically, movement-and-display unit 1010 includes an image generation unit 1012 and a positional relation updating unit 1014.

Image generation unit 1012 generates an image for left eye and an image for right eye by picking up an image of an object arranged in the virtual space with the pair of virtual cameras. Namely, image generation unit 1012 refers to virtual space memory 1002, renders ranges in which images are picked up by respective cameras, and generates the image for left eye and the image for right eye.

Positional relation updating unit 1014 updates relative positional relation between the object arranged in the virtual space and the pair of virtual cameras. Positional relation updating unit 1014 causes an object to be displayed as moving, by moving the object in an orientation in parallel to the reference plane in the virtual space. More specifically, positional relation updating unit 1014 updates a position of the pair of virtual cameras in the virtual space in response to the user's operation through the input portion, and when parallax calculated by parallax calculation unit 1004 satisfies a condition for switching to a state where the object is not displayed, the object of interest is moved out of the image pick-up range of the pair of virtual cameras.

Thus, in response to the fact that parallax produced in the displayed object exceeds a first prescribed value, that is, when distance L1 from reference plane 410 to object 310 in the virtual space is equal to or smaller than the first prescribed value (criterion value A), movement-and-display unit 1010 sets the object to non-display. On the other hand, in response to the fact that parallax produced when the not-displayed object is displayed on the display is smaller than a second prescribed value smaller than the first prescribed value, that is, when distance L1 from reference plane 410 to the original position of object 310 in the virtual space is equal to or greater than the second prescribed value (criterion value B), movement-and-display unit 1010 allows display of the object.

As described above, a condition for changing displayed object 310 to a not-displayed state (criterion value A) is preferably different from a condition for changing not-displayed object 310 to a displayed state (criterion value B). More specifically, criterion value B is set to be greater than criterion value A.

Image output unit 1016 outputs the image for left eye and the image for right eye to a stereoscopic display device (display).

K. PROCESSING PROCEDURE

A processing procedure performed by the display control program according to the present embodiment will now be described with reference to FIG. 16.

Figure 16:
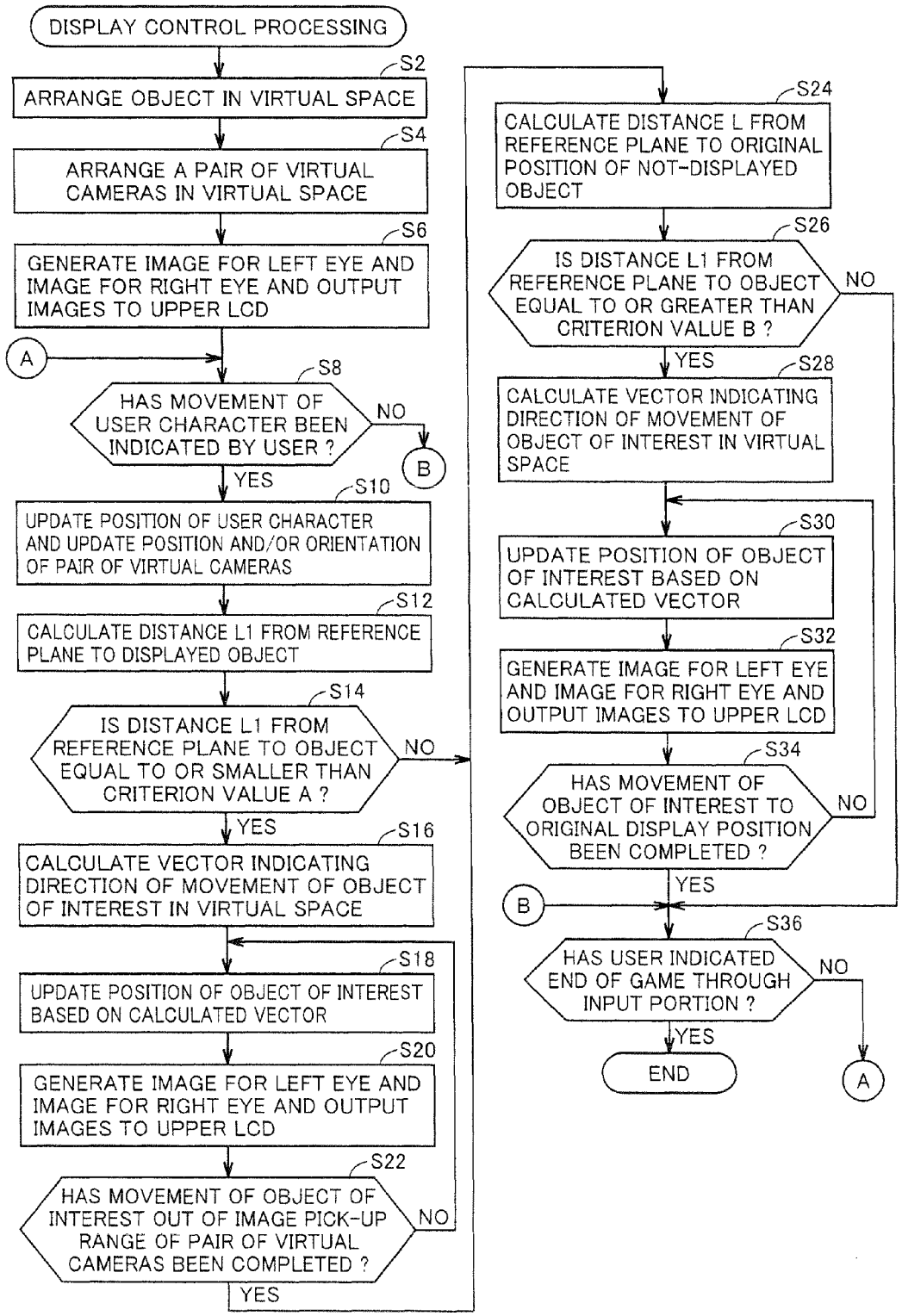
FIG. 16 shows an exemplary non-limiting flowchart showing a processing procedure performed in the game device.

Each step in each flowchart shown in FIG. 16 is typically provided as a result of reading and execution by operation processing unit 100 of a display control program or the like stored in game card 171 or the like. It is noted that a program executed by operation processing unit 100 does not have to be a single program and one application or a plurality of applications may be executed together with a program (or firmware) providing a basic OS (Operating System). In addition, a plurality of pieces of hardware may entirely or partially implement the processing shown below.

Initially, as the user indicates start of the game through the input portion, operation processing unit 100 arranges such objects as a character (including user character 300) and a background necessary for the game in the virtual space (step S2). More specifically, as described above, information on each object is written in virtual space memory 1002 (FIG. 15).

In succession, operation processing unit 100 arranges a pair of virtual cameras in the virtual space (step S4), and generates an image for left eye and an image for right eye as a result of image pick-up of the object present in an image pick-up range of the pair of virtual cameras and outputs the generated image for left eye and image for right eye to upper LCD 110 (step S6). It is noted that operation processing unit 100 also generates and outputs an image to be displayed on lower LCD 120.

Thereafter, operation processing unit 100 determines whether the user has indicated movement of user character 300 or not (step S8). Namely, operation processing unit 100 determines whether a command for moving user character 300 has been received through the input portion or not. When the user has not indicated movement of user character 300 (NO in step S8), the process proceeds to step S36.

In contrast, when the user has indicated movement of user character 300 (YES in step S8), operation processing unit 100 updates a position of user character 300 in accordance with the indication and updates a position and/or an orientation (a direction of point of view) of the pair of virtual cameras in accordance with the updated position of user character 300 (step S10).

In succession, operation processing unit 100 calculates a distance between the pair of virtual cameras and a displayed object, that is, distance L1 from reference plane 410 which is a plane including the pair of virtual cameras to object 310 (step S12). This distance L1 indicates a degree of parallax produced when each object is stereoscopically displayed on upper LCD 110. It is noted that it is not necessary to subject all objects arranged in the virtual space to the display control function according to the present embodiment and only a specific object may be subjected to that function. Therefore, a distance from reference plane 410 may be calculated in step S12 only in connection with a predetermined specific object.

In succession, operation processing unit 100 determines whether distance L1 from reference plane 410 to the displayed object calculated in step S12 is equal to or smaller than criterion value A or not (step S14). Namely, whether or not a displayed object of which stereo depth (stereoscopic effect) is equal to or greater than a prescribed value is present among the displayed objects is determined.

When distance L1 calculated in step S12 is equal to or smaller than criterion value A (YES in step S14), operation processing unit 100 calculates a vector (vector v described above) indicating a direction of movement of an object of interest in the virtual space based on reference plane 410 of the pair of virtual cameras (step S16). This vector is determined in accordance with a display position or the like of object 310 on the display surface of upper LCD 110 (display).

In succession, operation processing unit 100 updates the position of the object of interest based on the vector calculated in step S16 (step S18), and generates the image for left eye and the image for right eye as a result of image pick-up of the object present within the image pick-up range of the pair of virtual cameras in a state after the position of the object of interest has been updated and outputs the generated image for left eye and image for right eye to upper LCD 110 (step S20). In addition, operation processing unit 100 determines whether movement of the object of interest out of the image pick-up range of the pair of virtual cameras has been completed or not (step S22). When movement out of the image pick-up range of the pair of virtual cameras has not been completed (NO in step S22), processing in step S18 and subsequent steps is repeated.

In contrast, when movement out of the image pick-up range of the pair of virtual cameras has been completed (YES in step S22), the process proceeds to step S24. Here, operation processing unit 100 adds information (such as a flag) indicating that the object of interest has been switched from a display state to a non-display state.

On the other hand, when distance L1 from reference plane 410 calculated in step S12 to the displayed object is greater than criterion value A (NO in step S14), the processing in steps S16 to S22 described above is skipped.

In succession, operation processing unit 100 calculates a distance between the pair of virtual cameras and the original display position of the not-displayed object in the virtual space, that is, distance L1 from reference plane 410 which is a plane including the pair of virtual cameras to the original position of object 310 (step S24). This distance L1 indicates a degree of parallax produced when each object is stereoscopically displayed on upper LCD 110. Here, a distance is calculated only with regard to the object previously changed to the non-display state. Such an object for which a distance should be calculated is determined based on information (such as a flag) indicating switching from a display state to a non-display state.

In succession, operation processing unit 100 determines whether distance L1 from reference plane 410 calculated in step S24 to the original display position of the not-displayed object is equal to or greater than criterion value B or not (step S26). Namely, whether or not an object of which stereo depth (stereoscopic effect) is equal to or smaller than a prescribed value is present among the not-displayed objects is determined.

When distance L1 calculated in step S24 is equal to or greater than criterion value B (YES in step S26), operation processing unit 100 calculates a vector (vector v described above) indicating a direction of movement of an object of interest in the virtual space based on reference plane 410 of the pair of virtual cameras (step S28). This vector is determined in accordance with a display position or the like of object 310 on the display surface of upper LCD 110 (display).

In succession, operation processing unit 100 updates the position of the object of interest based on the vector calculated in step S28 (step S30), and generates the image for left eye and the image for right eye as a result of image pick-up of the object present within the image pick-up range of the pair of virtual cameras in a state after the position of the object of interest has been updated and outputs the generated image for left eye and image for right eye to upper LCD 110 (step S32). In addition, operation processing unit 100 determines whether movement of the object of interest to the original display position has been completed or not (step S34). When movement of the object of interest to the original display position has not been completed (NO in step S34), the processing in step S30 and subsequent steps is repeated.

In contrast, when movement of the object of interest to the original display position has been completed (YES in step S34), the process proceeds to step S36.

On the other hand, when distance L1 from reference plane 410 calculated in step S24 to the original position of the not-displayed object is smaller than criterion value B (NO in step S26), the processing in steps S28 to S34 described above is skipped.

Then, operation processing unit 100 determines whether the user has indicated end of the game through the input portion or not (step S36). When the user has indicated end of the game through the input portion (YES in step S36), the process ends. In contrast, when the user has not indicated end of the game through the input portion (NO in step S36), the processing in step S8 and subsequent steps is repeated.

It is noted that the processing procedure shown in FIG. 16 shows an example where processing in a case of switching the displayed object to the not-displayed state is performed separately from processing in a case of switching from the not-displayed object to display, however, the processing may be performed in parallel. In this case, distances between the pair of virtual cameras and all objects that are displayed and not displayed should only collectively be calculated and whether each calculated distance satisfies a prescribed condition or not should only be determined. When any condition is satisfied, corresponding processing is performed.

In the processing procedure shown in FIG. 16, in steps S6, S20, and S32, processing for outputting an image for left eye and an image for right eye to the display is performed. In addition, in steps S12 and S24, processing for calculating parallax produced when an object is displayed on the display is performed. Moreover, in steps S14 to S22, processing for moving a displayed object out of the effective display range to set the object to a not-displayed state in accordance with the calculated parallax is performed. Further, in steps S26 to S34, processing for setting a not-displayed object to a displayed state and then moving the object to the display position of the object is performed. In the processing for displaying the object as moving, the image for left eye and the image for right eye are generated such that parallax produced in the moving object is substantially maintained.

L. OTHER FORMS

In the embodiment described above, an example in which an object is moved within a three-dimensional virtual space has been shown, however, movement of an object includes also movement over the display surface.

Though a case where a series of processes is performed in single game device 1 has been described in the embodiment above, the series of processes above may be implemented as being distributed among a plurality of entities. For example, in an information processing system including game device 1 and a server device capable of communicating with game device 1 through a network, a part of the series of processes above may be performed by the server device. In addition, in the information processing system including game device 1 and the server device capable of communicating with game device 1 through the network, a substantial part of the series of processes above may be performed by the server device and partial processing may be performed by game device 1.

While certain example systems, methods, devices, apparatuses, and programs have been described herein, it is to be understood that the appended claims are not to be limited to the systems, methods, devices, apparatuses, and programs disclosed, but on the contrary, are intended to cover various modifications and equivalent arrangements included within the spirit and scope of the appended claims.

What is claimed is:

1. A non-transitory storage medium encoded with a computer readable display control program and executable by a computer of a display, the display being configured to be capable of providing stereoscopic display, the computer readable display control program upon execution by the computer provides functionality comprising:
   an image output for outputting an image for left eye and an image for right eye to said display;
   a parallax calculation for calculating parallax produced when an object is displayed on said display; and
   a movement-and-display for carrying out at least one of movement of a displayed object out of an effective display range and movement of a not-displayed object into the effective display range in accordance with calculated said parallax;
   wherein said movement-and-display are adapted to move, in response to parallax produced in the displayed object satisfying a first condition, the object out of the effective display range, and to move, in response to parallax produced when the not-displayed object is displayed on said display satisfying a second condition different from said first condition, the object into the effective display range.

2. The non-transitory storage medium according to claim 1, wherein
   said movement-and-display include
   an image generation for generating said image for left eye and said image for right eye by picking up images of an object arranged in a virtual space with a pair of virtual cameras, and
   a positional relation updating for updating relative positional relation between said object arranged in said virtual space and said pair of virtual cameras.

3. The non-transitory storage medium according to claim 2, wherein
   said movement-and-display are adapted to carry out movement of the displayed object out of the effective display range or movement of the not-displayed object into the effective display range based on comparison of a distance from a reference plane which is a plane including said pair of virtual cameras in said virtual space to said object with a prescribed value.

4. The non-transitory storage medium according to claim 3, wherein
   said movement-and-display are adapted to move the displayed object out of the effective display range when a distance from said reference plane to said object is equal to or smaller than a first prescribed value and to move the not-displayed object into the effective display range when a distance from said reference plane to said object is equal to or greater than a second prescribed value different from said first prescribed value.

5. The non-transitory storage medium according to claim 4, wherein
   said second prescribed value is greater than said first prescribed value.

6. The non-transitory storage medium according to claim 3, wherein
   said movement-and-display are adapted to move said object such that parallax produced in the moving object is substantially maintained.

7. The non-transitory storage medium according to claim 6, wherein
   said positional relation updating are adapted to display the object as moving, by moving the object in an orientation in parallel to said reference plane within said virtual space.

8. The non-transitory storage medium according to claim 1, wherein
   said movement-and-display are adapted to move the object gradually.

9. The non-transitory storage medium according to claim 1, wherein said movement-and-display are adapted to differ an orientation of movement of the object in accordance with a position of display of the object on a display surface of said display.

10. The non-transitory storage medium according to claim 1, wherein
said movement-and-display are adapted to differ an orientation of movement of the object in accordance with a distance from a position of display of the object to outside of the effective display range.

11. The non-transitory storage medium according to claim 10, wherein
said movement-and-display are adapted to move the object in an orientation in which a travel distance from the position of display of the object to the outside of the effective display range is shortest.

12. A display system including a display portion capable of providing stereoscopic display and a control entity for controlling display on said display portion, comprising:
an image output unit for outputting an image for left eye and an image for right eye to said display portion;
a parallax calculation unit for calculating parallax produced when an object is displayed on said display portion; and
a movement-and-display unit for carrying out at least one of movement of a displayed object out of an effective display range and movement of a not-displayed object into the effective display range in accordance with calculated said parallax;
wherein said movement-and-display unit is adapted to move, in response to parallax produced in the displayed object satisfying a first condition, the object out of the effective display range, and to move, in response to parallax produced when the not-displayed object is displayed on said display satisfying a second condition different from said first condition, the object into the effective display range.

13. A display control method performed in a computer of a display capable of providing stereoscopic display, comprising:
an image output step of outputting an image for left eye and an image for right eye to said display;
a parallax calculation step of calculating parallax produced when an object is displayed on said display; and
a movement-and-display step of carrying out at least one of movement of a displayed object out of an effective display range and movement of a not-displayed object into the effective display range in accordance with calculated said parallax;
wherein said movement-and-display step moves, in response to parallax produced in the displayed object satisfying a first condition, the object out of the effective display range, and moves, in response to parallax produced when the not-displayed object is displayed on said display satisfying a second condition different from said first condition, the object into the effective display range.

14. A display system, comprising:
a display portion capable of providing stereoscopic display;
a processing system, comprising at least one computer processor, the processing system being configured to perform at least the following:
an image output for outputting an image for left eye and an image for right eye to said display portion;
a parallax calculation for calculating parallax produced when an object is displayed on said display portion; and
a movement-and-display for carrying out at least one of movement of a displayed object out of an effective display range and movement of a not-displayed object into the effective display range in accordance with calculated said parallax;
wherein said movement-and-display includes movement of, in response to parallax produced in the displayed object satisfying a first condition, the object out of the effective display range, and movement of, in response to parallax produced when the not-displayed object is displayed on said display satisfying a second condition different from said first condition, the object into the effective display range.

* * * * *